(12) United States Patent
Morihana et al.

(10) Patent No.: US 10,514,286 B2
(45) Date of Patent: Dec. 24, 2019

(54) GAS FLOWMETER

(71) Applicant: Panasonic Intellectual Property Management Co., Ltd., Osaka (JP)

(72) Inventors: Hideaki Morihana, Nara (JP); Masato Satou, Nara (JP); Hidetomo Nagahara, Kyoto (JP); Masanobu Teraji, Nara (JP); Naoto Naganuma, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/108,168

(22) PCT Filed: Jan. 20, 2015

(86) PCT No.: PCT/JP2015/000216
§ 371 (c)(1),
(2) Date: Jun. 24, 2016

(87) PCT Pub. No.: WO2015/118809
PCT Pub. Date: Aug. 13, 2015

(65) Prior Publication Data
US 2016/0320218 A1 Nov. 3, 2016

(30) Foreign Application Priority Data
Feb. 7, 2014 (JP) ................. 2014-021956

(51) Int. Cl.
*G01F 1/66* (2006.01)
*G01F 15/18* (2006.01)

(52) U.S. Cl.
CPC ............... *G01F 1/66* (2013.01); *G01F 1/662* (2013.01); *G01F 1/667* (2013.01); *G01F 15/18* (2013.01); *G01F 15/185* (2013.01)

(58) Field of Classification Search
CPC ...................................................... G01F 1/662
See application file for complete search history.

(56) References Cited

U.S. PATENT DOCUMENTS

| | | | | |
|---|---|---|---|---|
| 6,453,757 B1* | 9/2002 | Montag | ................... | G01F 1/662 |
| | | | | 73/861.28 |
| 6,526,838 B1* | 3/2003 | Froelich | .................. | G01F 1/662 |
| | | | | 73/861.28 |

(Continued)

FOREIGN PATENT DOCUMENTS

| | | |
|---|---|---|
| AU | 723240 B | 5/1998 |
| CN | 1235670 A | 11/1999 |

(Continued)

OTHER PUBLICATIONS

International Search Report of PCT application No. PCT/JP2015/000216 dated Feb. 24, 2015.

(Continued)

*Primary Examiner* — Paul M. West
*Assistant Examiner* — Mark A Shabman
(74) *Attorney, Agent, or Firm* — Brinks Gilson & Lione

(57) ABSTRACT

A gas flowmeter includes: device body (1) which accommodates a fluid to be measured; inlet pipe (4) through which the fluid to be measured flows into device body (1); and outlet pipe (5) through which the fluid to be measured flows out from device body (1) through connecting pipe (7). The gas flow meter also includes: ultrasonic flow rate measuring unit (9) which has a first end side connected to outlet pipe (5) and performs flow rate measurement of the fluid to be measured which flows in ultrasonic flow rate measuring unit (9); and connecting pipe (7) which is disposed between ultrasonic flow rate measuring unit (9) and outlet pipe (5), and is connected to outlet pipe (5). The gas flow meter (Continued)

further includes support member (10) which supports a second end side of ultrasonic flow rate measuring unit (9).

12 Claims, 40 Drawing Sheets

(56) References Cited

U.S. PATENT DOCUMENTS

| 2012/0006127 A1* | 1/2012 | Nielsen ................ G01F 1/66 73/861.27 |
| 2013/0167655 A1 | 7/2013 | Fujii et al. |

FOREIGN PATENT DOCUMENTS

| EP | 0 744 596 A1 | 11/1996 |
| EP | 2 505 968 A1 | 10/2012 |
| FR | 2 755 232 A1 | 4/1998 |
| JP | 9-005133 A | 1/1997 |
| JP | 2012-163518 | 8/2012 |
| JP | 2014-157016 A | 8/2014 |
| WO | 1998/019137 | 5/1998 |
| WO | 1998/019138 | 5/1998 |
| WO | 2012/164859 | 12/2012 |
| WO | 2012/169201 A1 | 12/2012 |

OTHER PUBLICATIONS

Extended Search Report in corresponding European Application No. 15746414.0, dated Feb. 13, 2017, 9 pages.
English Translation of Chinese Search Report dated Sep. 5, 2018 for the related Chinese Patent Application No. 201580007134.9.

\* cited by examiner

GAS FLOWMETER

TECHNICAL FIELD

The present invention relates to a gas flowmeter for measuring a flow rate of a gas.

BACKGROUND ART

A gas flowmeter measures a flow rate of a gas (fluid to be measured) in such a manner that an ultrasonic wave is propagated through a gas which flows in a measuring pipe provided to a middle portion of a gas flow passage. For example, the gas flowmeter measures a flow rate of a gas by making use of a propagation time of an ultrasonic wave or a propagation speed of an ultrasonic wave.

FIG. 42 is a side view of a conventional gas flowmeter. Device body 101 is configured by upper case 102 and lower case 103 which are formed by performing press working on metal. Inlet pipe 104 and outlet pipe 105 are disposed on upper case 102. Inlet pipe 104 opens in the inside of device body 101 through cut-off valve 106. Ultrasonic flow rate measuring unit 108 is connected to outlet pipe 105 through L-shaped connecting pipe 107.

However, in the conventional configuration, outlet pipe 105 supports ultrasonic flow rate measuring unit 108 in a cantilever manner. Accordingly, ultrasonic flow rate measuring unit 108 is supported in an unstable state. Particularly, the configuration is adopted where outlet pipe 105 supports ultrasonic flow rate measuring unit 108 approximately horizontally and hence, a moment applied to outlet pipe 105 becomes large thus bringing ultrasonic flow rate measuring unit 108 into a more unstable state. As a result, ultrasonic flow rate measuring unit 108 easily swings. This swinging of ultrasonic flow rate measuring unit 108 gives rise to a drawback that stable flow rate measurement cannot be performed.

To overcome this drawback, the configuration may be considered where connecting pipe 107 and ultrasonic flow rate measuring unit 108 are fixed to device body 101 by bolts. In such a configuration, device body 101 is formed by performing press working on metal. Accordingly, bolts penetrate device body 101. In this case, to prevent leakage of a gas through between the bolt and a periphery of a hole formed in device body 101, a sealing material is provided.

However, durability of the sealing material is not sufficient compared to a life of a gas meter. Accordingly, there is a drawback that leakage of a gas occurs between the bolt and the periphery of the hole formed in device body 101 when the sealing material is peeled off.

CITATION LIST

Patent Literature

PTL 1: Unexamined Japanese Patent Publication No. 2012-163518

SUMMARY OF THE INVENTION

The present invention has been made to overcome the drawbacks of the conventional art, and it is an object of the present invention to enhance accuracy of flow rate measurement in a gas flowmeter having an ultrasonic flow rate measuring unit and a flow passage.

A gas flowmeter according to the present invention includes: a device body which accommodates a fluid to be measured; an inlet pipe through which the fluid to be measured flows into the device body; and an outlet pipe through which the fluid to be measured flows out from the device body through a connecting pipe. The gas flowmeter of the present invention further includes: an ultrasonic flow rate measuring unit which has a first end side connected to the connecting pipe and performs flow rate measurement of the fluid to be measured which flows in the ultrasonic flow rate measuring unit; and the connecting pipe which is disposed between the ultrasonic flow rate measuring unit and the outlet pipe, and is connected to the outlet pipe. The gas flowmeter further includes a support member which supports a second end side of the ultrasonic flow rate measuring unit.

According to the gas flowmeter of the present invention, vibrations of the ultrasonic flow rate measuring unit can be suppressed and hence, accuracy of flow rate measurement can be enhanced.

DESCRIPTION OF EMBODIMENTS

Hereinafter, exemplary embodiments of the present invention are described with reference to the drawings. The present invention is not limited to these exemplary embodiments.

First Exemplary Embodiment

Figure 1:
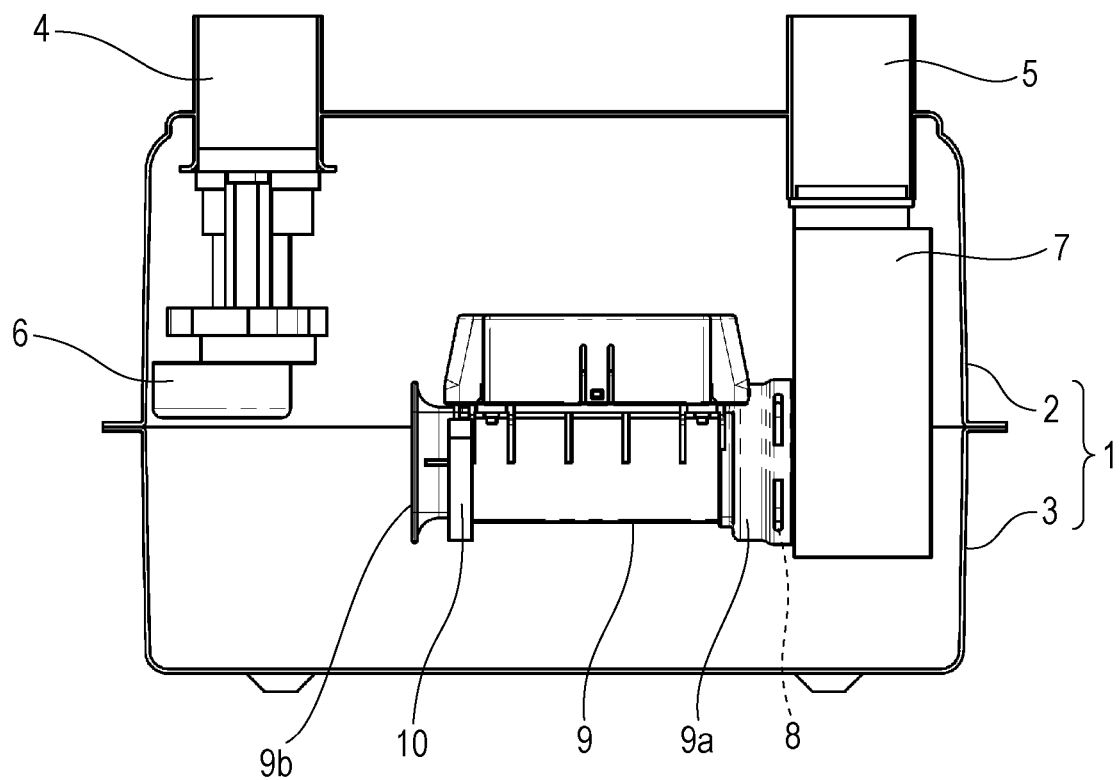
FIG. 1 is a side view of a gas flowmeter according to a first exemplary embodiment of the present invention.
Figure 2:
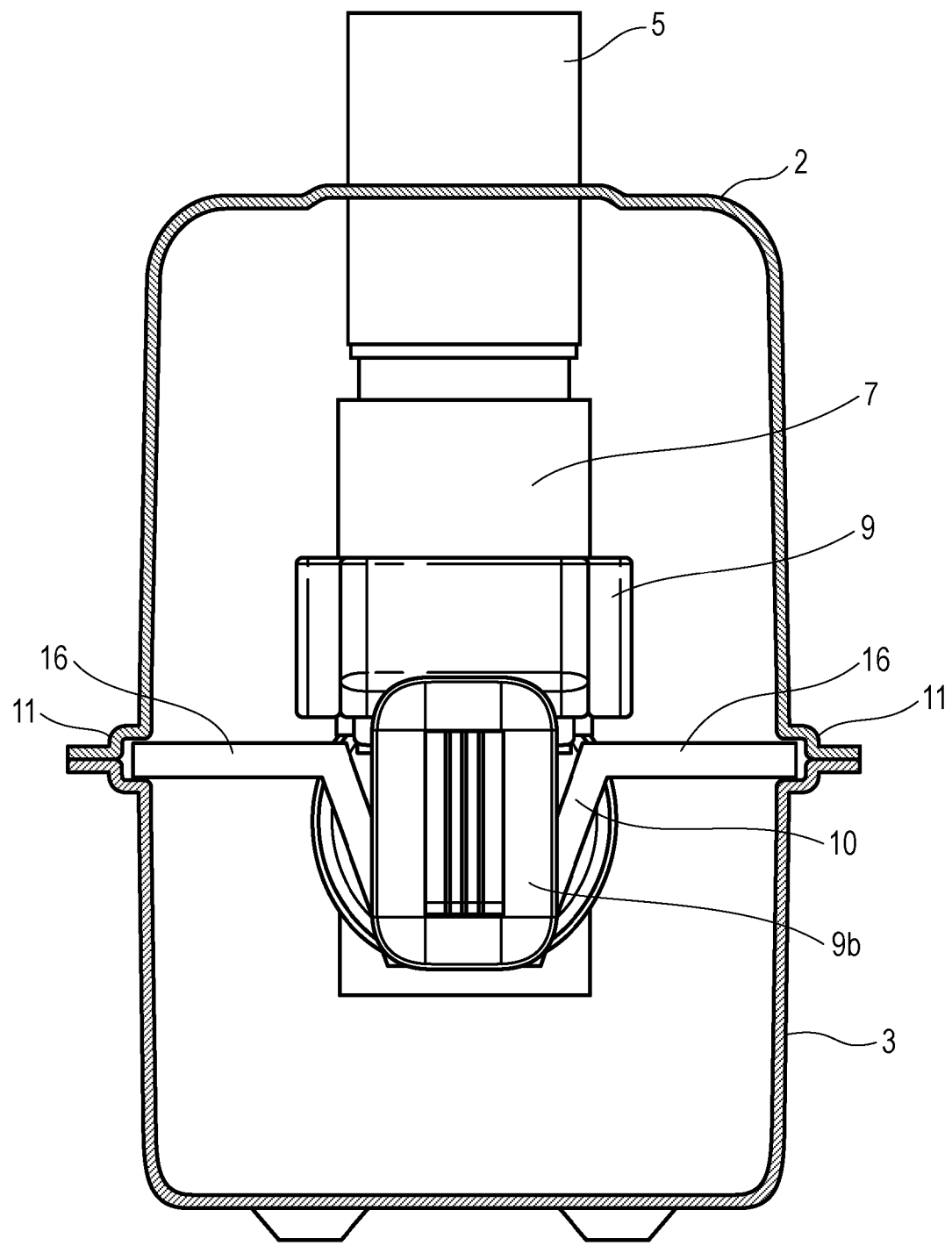
FIG. 2 is a cross-sectional view of the gas flowmeter according to the first exemplary embodiment of the present invention as viewed in another direction.
Figure 3:
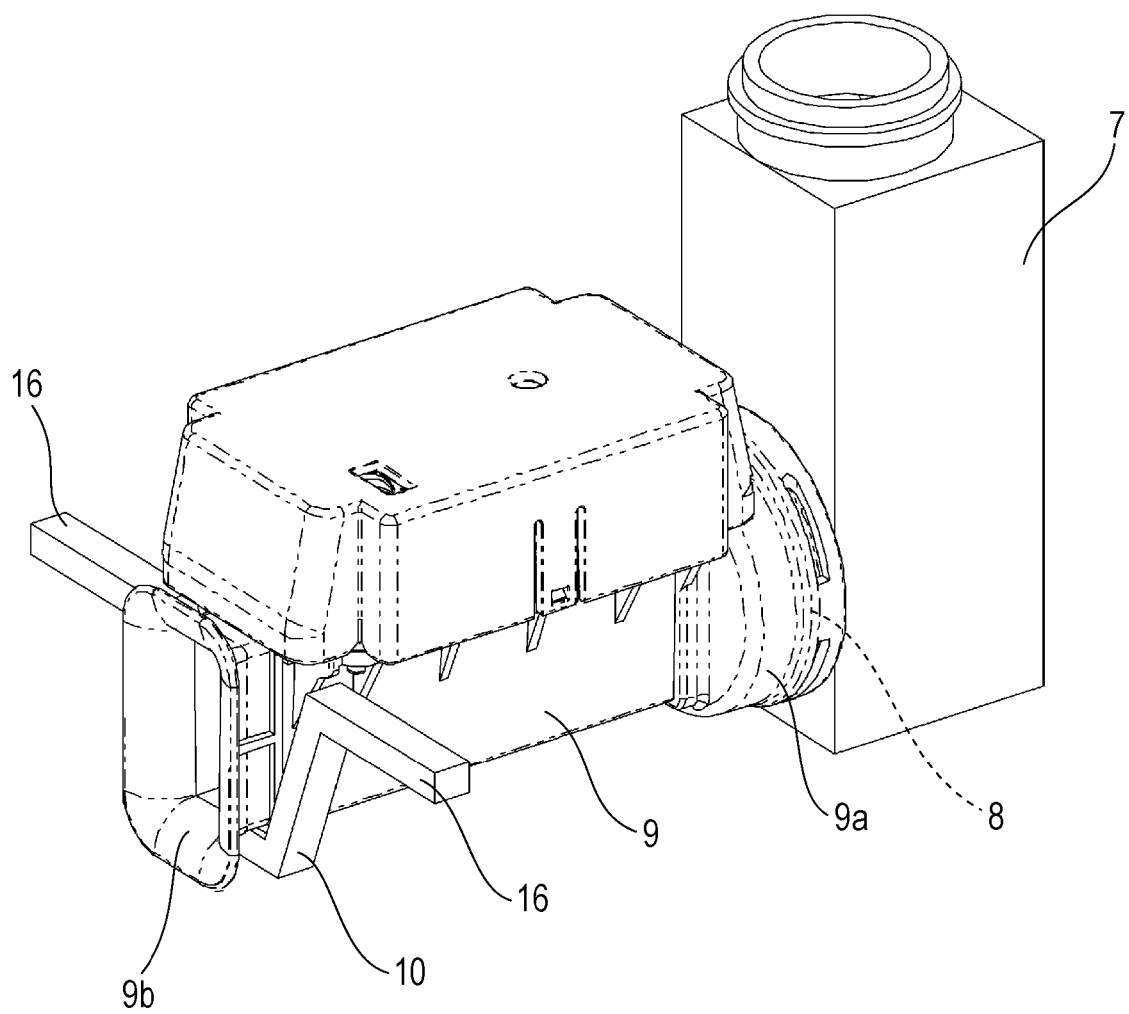
FIG. 3 is a perspective view of a main part of the gas flowmeter according to the first exemplary embodiment of the present invention.
Figure 4:
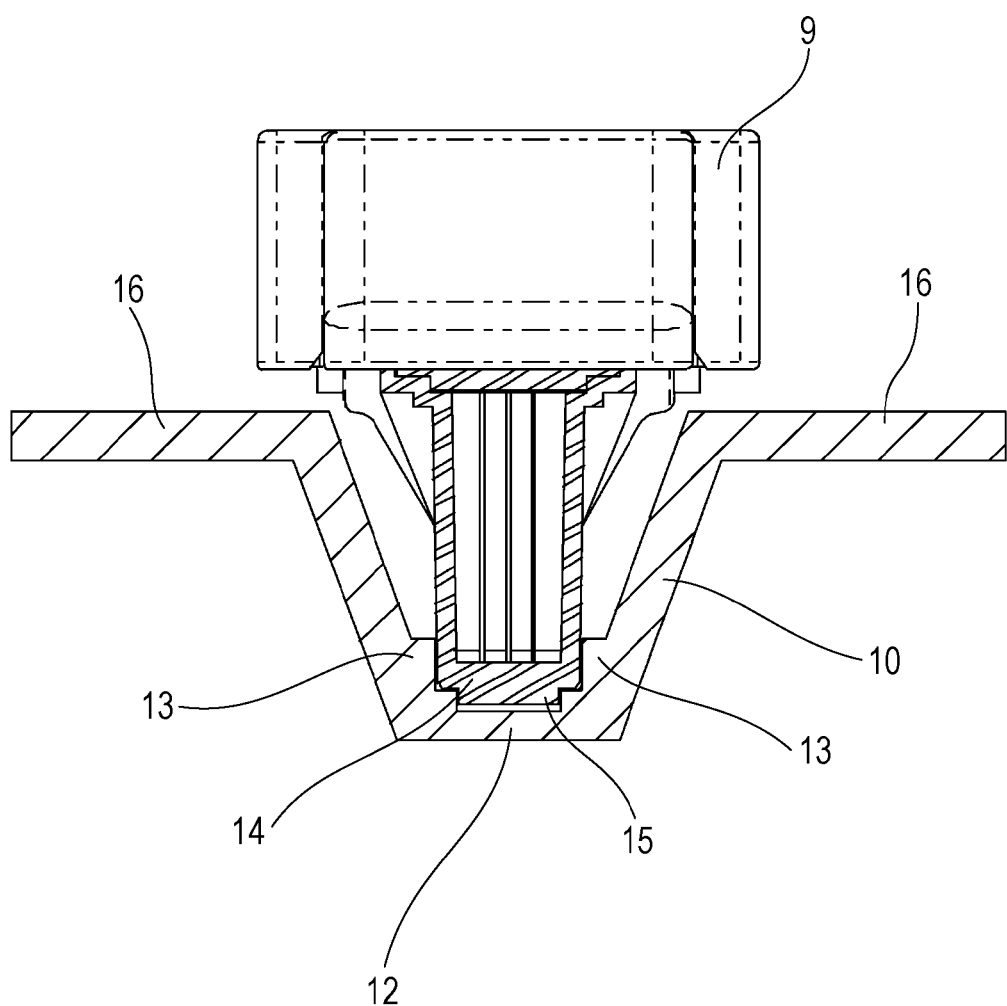
FIG. 4 is an enlarged cross-sectional view of the main part of the gas flowmeter according to the first exemplary embodiment of the present invention.
Figure 5:
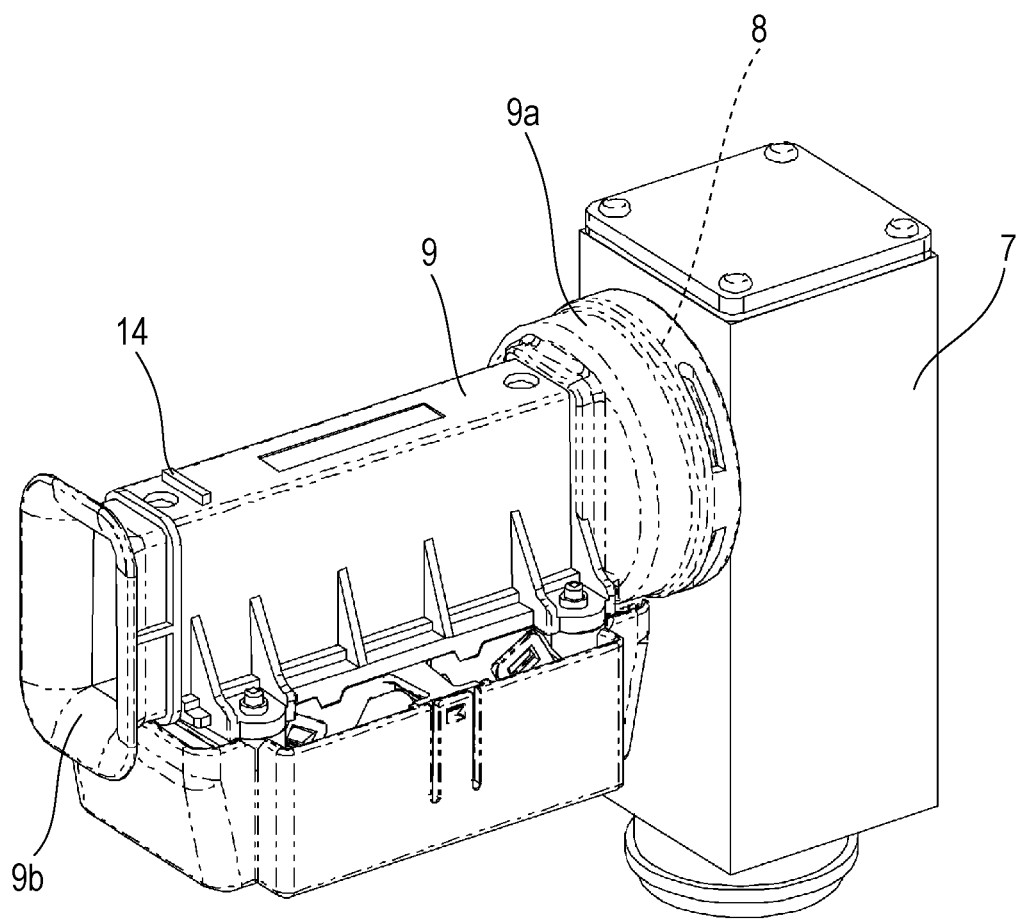
FIG. 5 is a perspective view of the main part of the gas flowmeter according to the first exemplary embodiment of the present invention.
Figure 6:
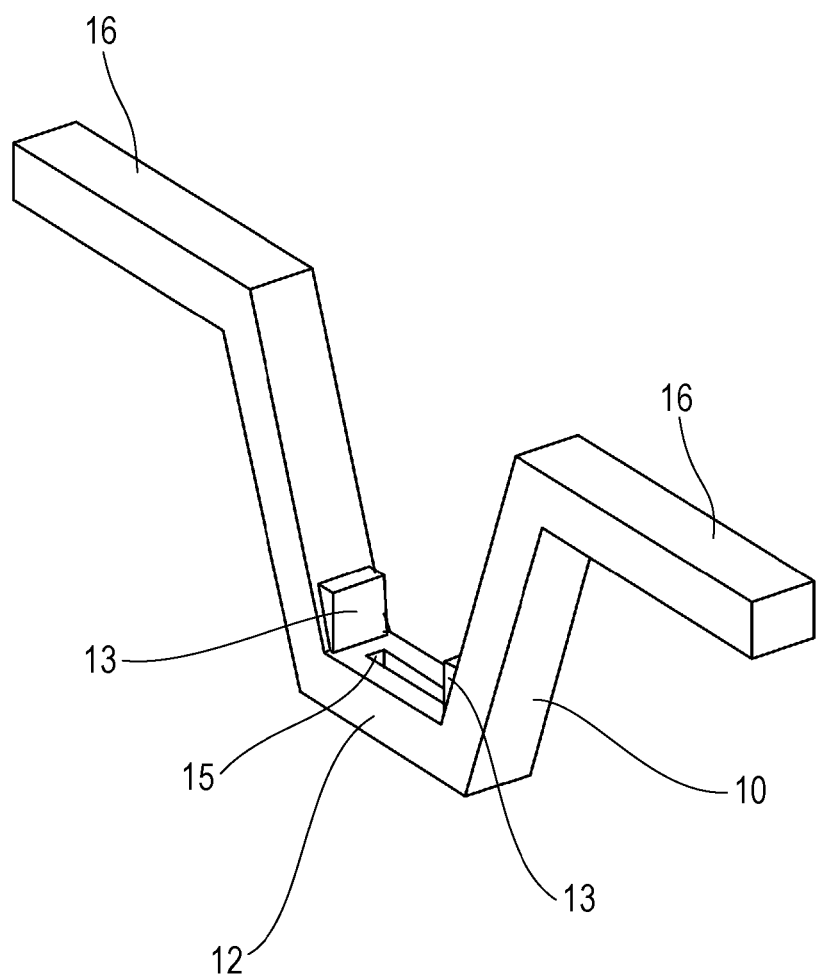
FIG. 6 is a perspective view of a support member of the gas flowmeter according to the first exemplary embodiment of the present invention.

FIG. 1 is a side view of a gas flowmeter according to a first exemplary embodiment of the present invention. FIG. 2 is a cross-sectional view of the gas flowmeter as viewed in another direction. FIG. 3 is a perspective view of a main part of the gas flowmeter. FIG. 4 is an enlarged cross-sectional view of the main part of the gas flowmeter. FIG. 5 is a perspective view of the main part of the gas flowmeter. FIG. 6 is a perspective view of a support member of the gas flowmeter.

An outer shell of the gas flowmeter is configured by device body 1. Device body 1 air-tightly accommodates a gas (fluid to be measured) therein. Device body 1 is configured by upper case 2 and lower case 3 formed by performing press working on metal. Inlet pipe 4 and outlet pipe 5 are disposed on an upper surface of upper case 2. Inlet pipe 4 opens in the inside of device body 1 through cut-off valve 6. A fluid to be measured flows into device body 1 through inlet pipe 4. Connecting pipe 7 is connected to outlet pipe 5. Mounting portion 8 is connected to connecting pipe 7. Outflow port 9a of ultrasonic flow rate measuring unit 9 is connected to mounting portion 8 and is fixed to mounting portion 8 by a fixing fitting (not shown in the drawing). Ultrasonic flow rate measuring unit 9 performs flow rate measurement of a fluid to be measured which flows in ultrasonic flow rate measuring unit 9. A fluid to be measured flows into device body 1, passes through ultrasonic flow rate measuring unit 9, mounting portion 8, connecting pipe 7 and outlet pipe 5, and flows out to the outside.

Ultrasonic flow rate measuring unit 9, and inflow port 9b disposed in a spaced apart manner from connecting pipe 7 are supported by support member 10. Support member 10 is positioned and held by holding portion 11 formed on a contact portion between upper case 2 and lower case 3.

Support member 10 includes fixing portion 12 which fixes ultrasonic flow rate measuring unit 9 to an upper surface of a center portion thereof. Restricting portion 13 which positionally restricts both side surfaces of a lower portion of ultrasonic flow rate measuring unit 9 is formed on fixing portion 12. Recessed groove 15 into which projecting portion 14 formed on a bottom surface of ultrasonic flow rate measuring unit 9 is inserted is formed in fixing portion 12. Support arms 16 are mounted on both sides of support member 10 such that support arms 16 extend outward. Support arms 16 are positioned and held by holding portions 11 formed on the contact portion between upper case 2 and lower case 3. Holding portions 11 are formed only at positions corresponding to support arms 16, and hold support arms 16 in a stable manner.

Next, the manner of operation of the gas flowmeter having the above configuration is described.

As shown in FIG. 1 to FIG. 6, ultrasonic flow rate measuring unit 9 is positioned and fixed by support member 10 by inserting projecting portion 14 into recessed groove 15 using restricting portions 13 of support member 10 as guides.

In such a state, outflow port 9a of ultrasonic flow rate measuring unit 9 is connected to mounting portion 8 of connecting pipe 7, and is fixed to mounting portion 8 by the fixing fitting (not shown in the drawing). Fixing of ultrasonic flow rate measuring unit 9 to mounting portion 8 may be performed using engaging pawls or the like. With the use of such a configuration, the fixing fitting can be abolished. Accordingly, assembling operability can be enhanced and a gas flowmeter can be manufactured at a low cost.

The state shown in FIG. 1 to FIG. 6 is a state where connecting pipe 7, ultrasonic flow rate measuring unit 9 and support member 10 are integrally formed with each other. Accordingly, connecting pipe 7, ultrasonic flow rate measuring unit 9 and support member 10 can be handled as one unit. With such a configuration, handling of the gas flowmeter can be enhanced, and assembling operability of device body 1 can be enhanced.

In assembling connecting pipe 7, ultrasonic flow rate measuring unit 9 and support member 10 which are integrally formed with each other into device body 1, upper case 2 is reversed. Then, connecting pipe 7 is connected to outlet pipe 5 fixed to upper case 2, and support arms 16 of support members 10 are temporarily held by holding portions 11 of upper case 2. Then, upper case 2 is covered by lower case 3, and peripheries of upper case 2 and lower case 3 are air-tightly sealed.

With such a configuration, in the gas flowmeter according to this exemplary embodiment, ultrasonic flow rate measuring unit 9 is held such that outflow port 9a is fixed to connecting pipe 7 by way of mounting portion 8, and inflow port 9b is held by holding portion 11 of device body 1 by way of support members 10. Accordingly, ultrasonic flow rate measuring unit 9 can be held in a stable manner. As a result, the gas flowmeter can perform stable flow rate measurement by suppressing swinging of ultrasonic flow rate measuring unit 9.

Further, even when vibrations are generated during transportation or the like, swinging of ultrasonic flow rate measuring unit 9 can be suppressed. Accordingly, the deformation or the like in a connecting portion between outlet pipe 5 and upper case 2 can be suppressed. As a result, it is possible to prevent sealing property of the connecting portion between outlet pipe 5 and upper case 2 from being deteriorated.

In the above description, ultrasonic flow rate measuring unit 9 is connected to connecting pipe 7 in a state where ultrasonic flow rate measuring unit 9 is supported by support member 10. As another configuration, ultrasonic flow rate measuring unit 9 may be supported by support member 10 after ultrasonic flow rate measuring unit 9 is connected to connecting pipe 7.

As described above, the gas flowmeter according to this exemplary embodiment includes: device body 1 which accommodates a fluid to be measured; inlet pipe 4 through which the fluid to be measured flows into device body 1; and outlet pipe 5 through which the fluid to be measured flows out from device body 1 through connecting pipe 7. The gas flowmeter of this exemplary embodiment further includes: ultrasonic flow rate measuring unit 9 which has a first end side connected to connecting pipe 7 and performs flow rate measurement of the fluid to be measured which flows in ultrasonic flow rate measuring unit 9; and connecting pipe 7 which is disposed between ultrasonic flow rate measuring unit 9 and outlet pipe 5, and is connected to outlet pipe 5. The gas flowmeter further includes support member 10 which supports a second end side of ultrasonic flow rate measuring unit 9. With such a configuration, the gas flowmeter of this exemplary embodiment can perform stable flow rate measurement by suppressing swinging of ultrasonic flow rate measuring unit 9.

Support member 10 is supported by device body 1. With such a configuration, the gas flowmeter of this exemplary embodiment can perform stable flow rate measurement by suppressing swinging of ultrasonic flow rate measuring unit 9.

Support member 10 includes fixing portion 12 for fixing ultrasonic flow rate measuring unit 9. With such a configuration, ultrasonic flow rate measuring unit 9 can be stably supported.

Restricting portions 13 which position ultrasonic flow rate measuring unit 9 are formed on fixing portion 12. With such a configuration, the gas flowmeter of this exemplary embodiment can perform stable flow rate measurement by suppressing swinging of ultrasonic flow rate measuring unit 9.

Fixing portion 12 has recessed groove 15 into which a projecting portion of ultrasonic flow rate measuring unit 9 is inserted. With such a configuration, ultrasonic flow rate measuring unit 9 can be stably supported.

Second Exemplary Embodiment

Hereinafter, the second exemplary embodiment of the present invention is described with reference to FIG. 7 to FIG. 11. Parts having an identical configuration with the corresponding parts of the first exemplary embodiment are given same symbols and the description of these parts is omitted.

Figure 7:
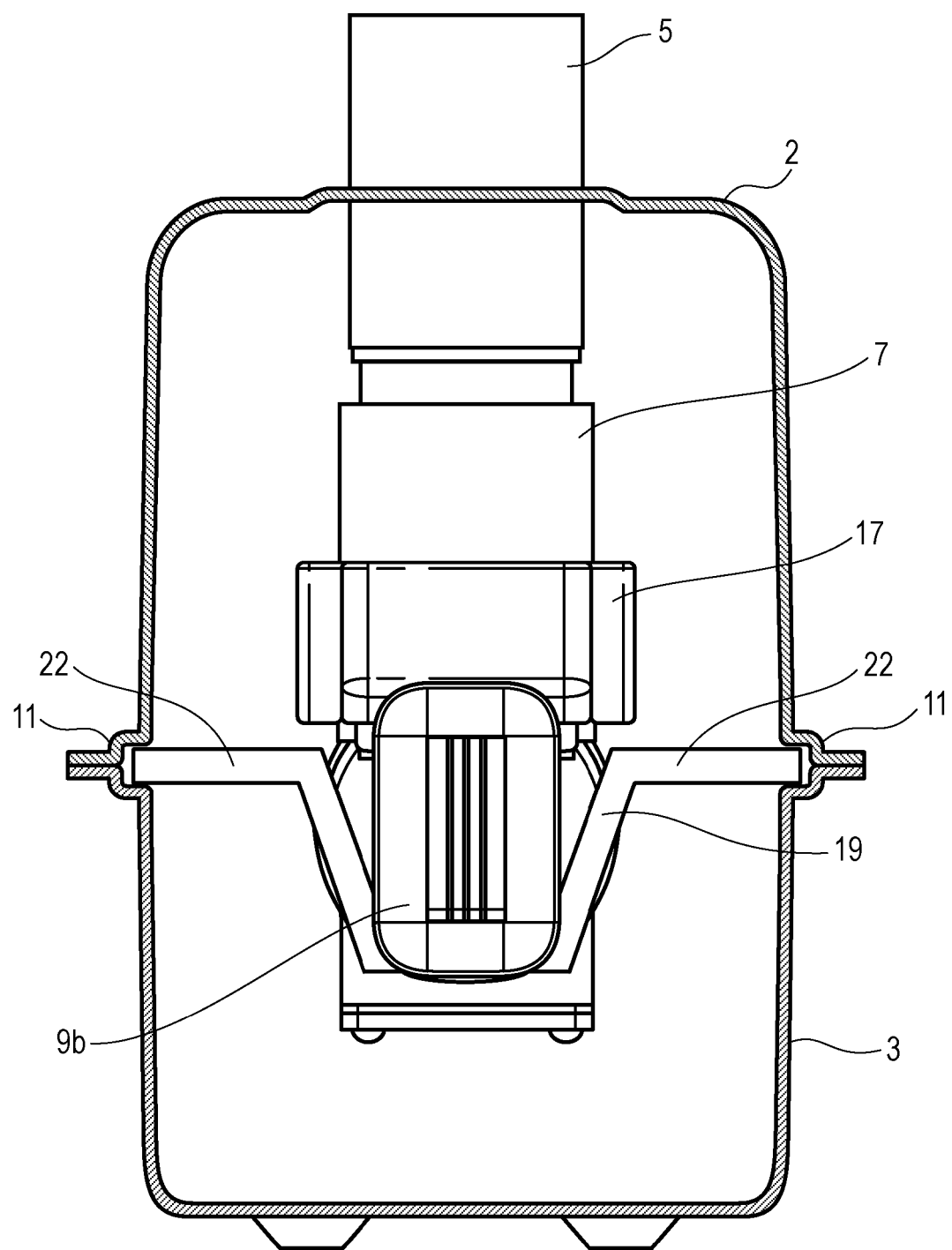
FIG. 7 is a cross-sectional view of a gas flowmeter according to a second exemplary embodiment of the present invention.
Figure 8:
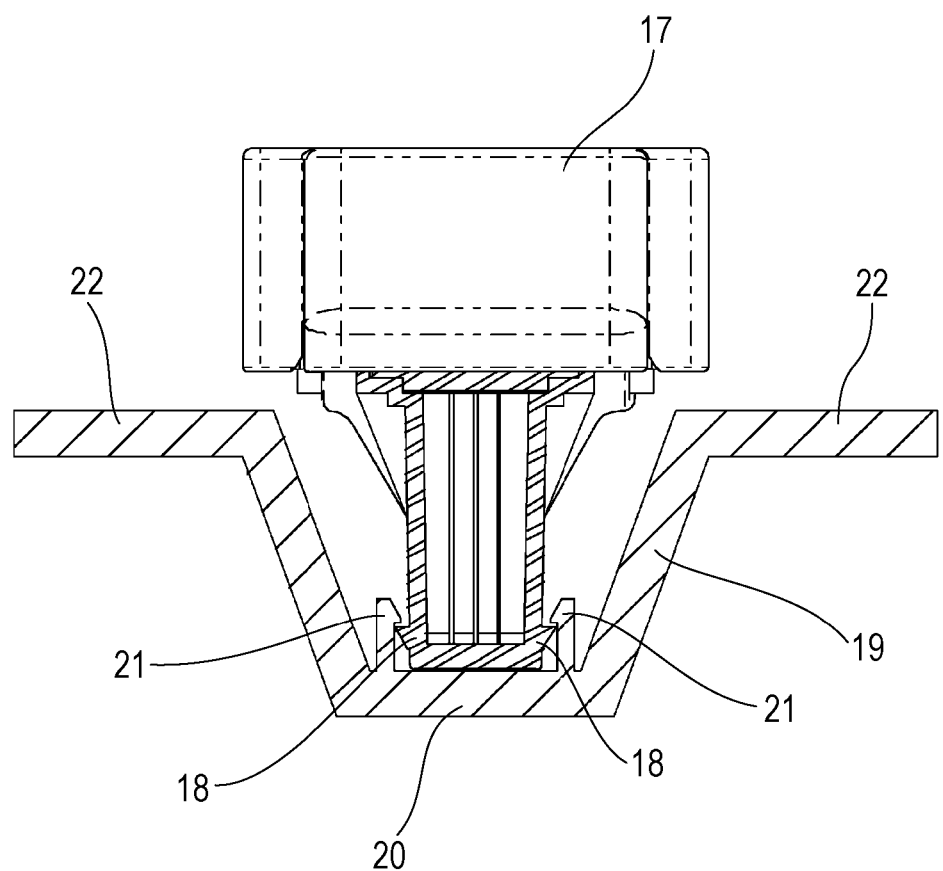
FIG. 8 is a cross-sectional view of a main part of the gas flowmeter according to the second exemplary embodiment of the present invention.
Figure 9:
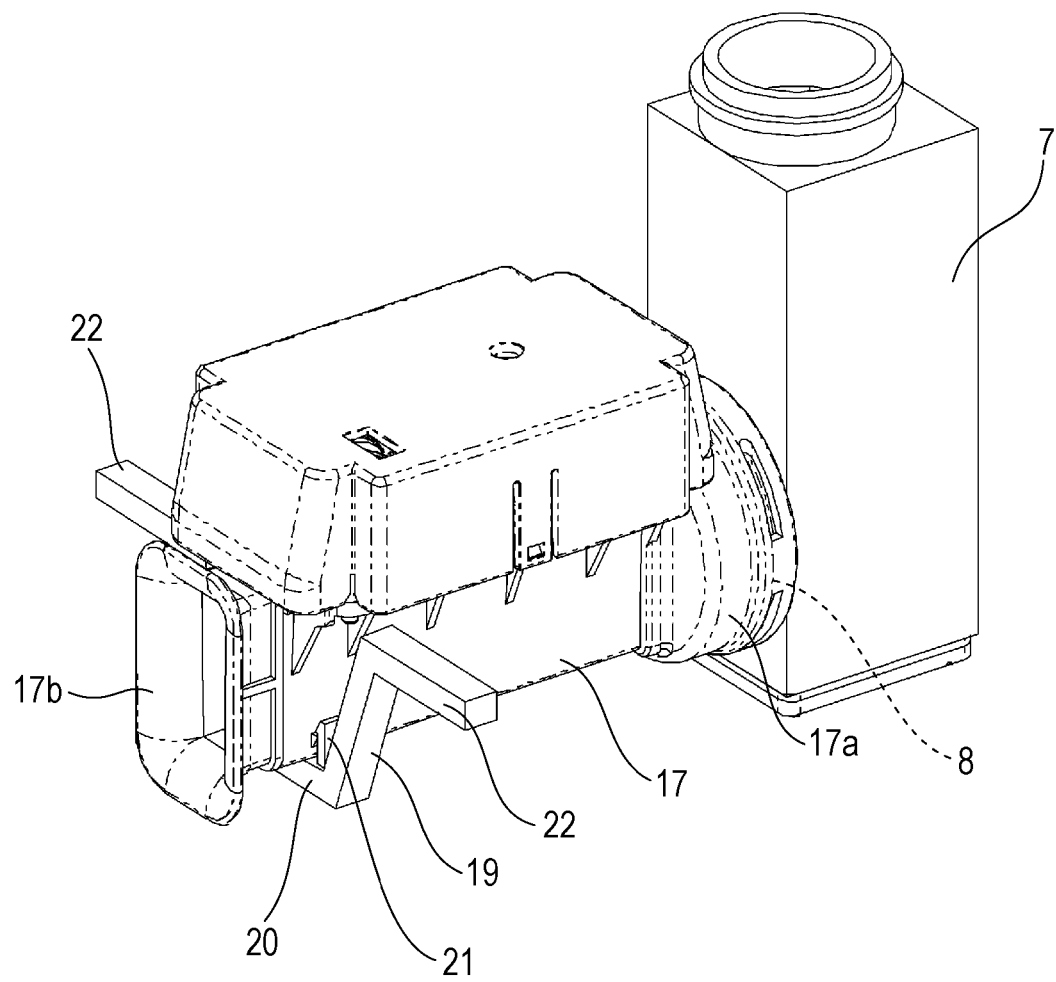
FIG. 9 is a perspective view of a main part of the gas flowmeter according to the second exemplary embodiment of the present invention.
Figure 10:
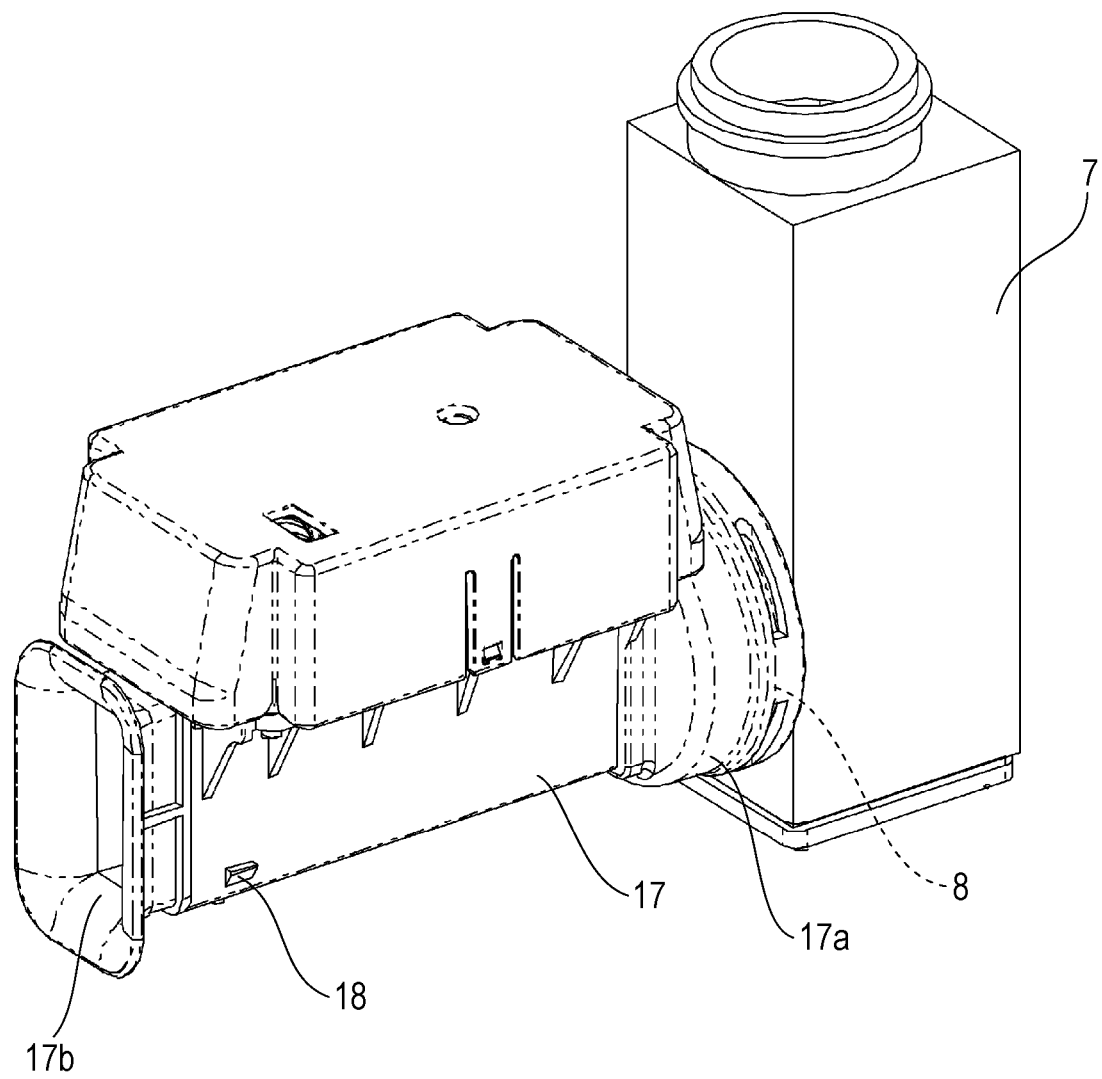
FIG. 10 is a perspective view of the main part of the gas flowmeter according to the second exemplary embodiment of the present invention.
Figure 11:
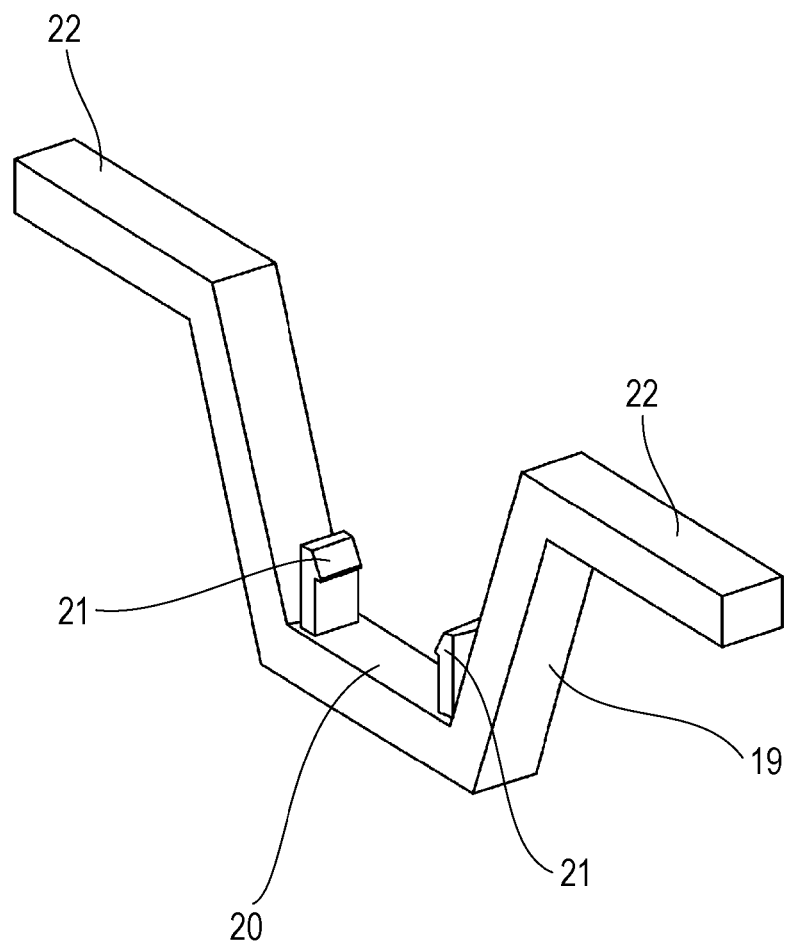
FIG. 11 is a perspective view of a support member of the gas flowmeter according to the second exemplary embodiment of the present invention.

FIG. 7 is a cross-sectional view of a gas flowmeter according to the second exemplary embodiment of the present invention. FIG. 8 is a cross-sectional view of a main part of the gas flowmeter. FIG. 9 is a perspective view of a main part of the gas flowmeter. FIG. 10 is a perspective view of the main part of the gas flowmeter. FIG. 11 is a perspective view of a support member of the gas flowmeter.

In the second exemplary embodiment, ultrasonic flow rate measuring unit 17 has locking projections 18 on lower portions of both side surfaces thereof on an inflow port 17b side. Support member 19 has fixing portion 20 on a center portion thereof, and has locking pawls 21 on a left side and a right side of an upper surface of fixing portion 20. Locking pawls 21 engage with locking projections 18 of ultrasonic flow rate measuring unit 17. Support arms 22 are formed on support member 19 such that support arms 22 extend outward from both sides of the fixing portion 20.

In the above configuration, ultrasonic flow rate measuring unit 17 is fixed to support member 19 by making locking projections 18 engage with locking pawls 21 formed on fixing portion 20 of support member 19. Outflow port 17a of ultrasonic flow rate measuring unit 17 is connected to mounting portion 8 of connecting pipe 7, and is fixed to mounting portion 8 using the fixing fitting (not shown in the drawing). Fixing of ultrasonic flow rate measuring unit 17 to mounting portion 8 may be performed using engaging pawls or the like. With the use of such a configuration, the fixing fitting can be abolished. Accordingly, assembling operability can be enhanced and the gas flowmeter can be manufactured at a low cost.

The state shown in FIG. 7 to FIG. 11 is a state where connecting pipe 7, ultrasonic flow rate measuring unit 17 and support member 19 are integrally formed with each other. Accordingly, connecting pipe 7, ultrasonic flow rate measuring unit 17 and support member 19 can be handled as one unit. With such a configuration, handling of the gas flowmeter can be enhanced, and assembling operability of device body 1 can be enhanced.

In assembling connecting pipe 7, ultrasonic flow rate measuring unit 17 and support member 19 which are integrally formed with each other into device body 1, upper case 2 is reversed. Then, connecting pipe 7 is connected to outlet pipe 5 fixed to upper case 2, and support arms 22 of support members 19 are temporarily held by holding portions 11 of upper case 2. Then, upper case 2 is covered by lower case 3, and peripheries of upper case 2 and lower case 3 are air-tightly sealed.

In the above description, ultrasonic flow rate measuring unit 17 is connected to connecting pipe 7 in a state where ultrasonic flow rate measuring unit 17 is supported by support member 19. As another configuration, ultrasonic flow rate measuring unit 17 may be supported by support member 19 after ultrasonic flow rate measuring unit 17 is connected to connecting pipe 7.

Ultrasonic flow rate measuring unit 17 is held such that outflow port 17a is fixed to connecting pipe 7 by way of mounting portion 8, and inflow port 17b is held by device body 1 by way of support arms 22. Accordingly, ultrasonic flow rate measuring unit 17 can be held in a stable manner. As a result, the gas flowmeter can perform stable flow rate measurement by suppressing swinging of ultrasonic flow rate measuring unit 17.

Further, even when vibrations are generated during transportation or the like, swinging of ultrasonic flow rate measuring unit 17 can be suppressed. Accordingly, the deformation or the like in a connecting portion between outlet pipe 5 and upper case 2 can be suppressed. As a result, it is possible to prevent sealing property of a connecting portion between outlet pipe 5 and upper case 2 from being deteriorated.

As described above, in this exemplary embodiment, fixing portion 20 includes locking pawls 21 on a left side and a right side of an upper surface thereof. Further, ultrasonic flow rate measuring unit 17 has locking projections 18 on lower portions of both side surfaces thereof. Further, locking pawl 21 is engaged with locking projection 18. With such a configuration, assembling operability can be enhanced and a gas flowmeter can be manufactured at a low cost.

Third Exemplary Embodiment

Hereinafter, the third exemplary embodiment of the present invention is described with reference to FIG. 12 to FIG. 16. Parts having an identical configuration with the corresponding parts of the first exemplary embodiment or the second exemplary embodiment are given same symbols and the description of these parts is omitted.

Figure 12:
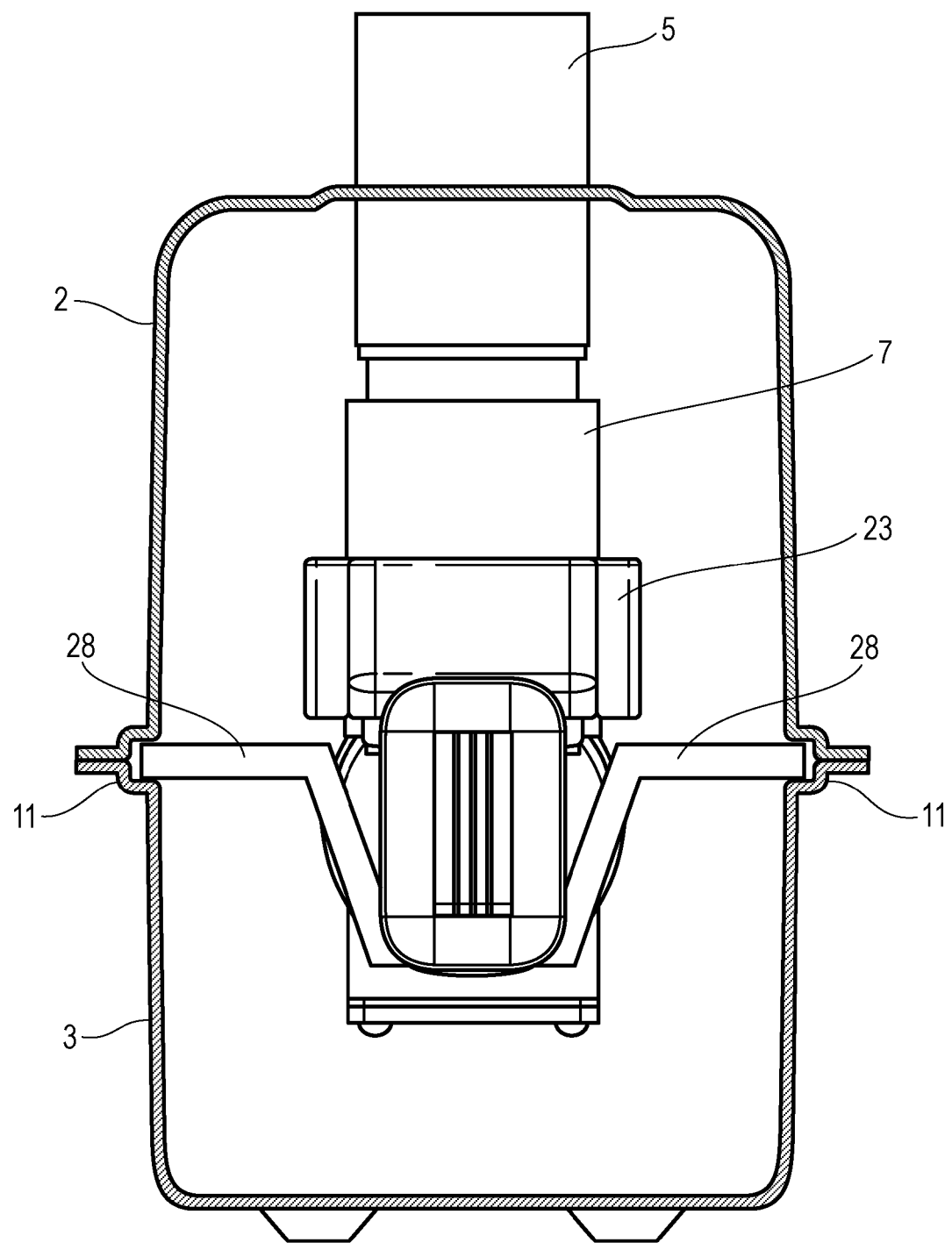
FIG. 12 is a cross-sectional view of a gas flowmeter according to a third exemplary embodiment of the present invention.
Figure 13:
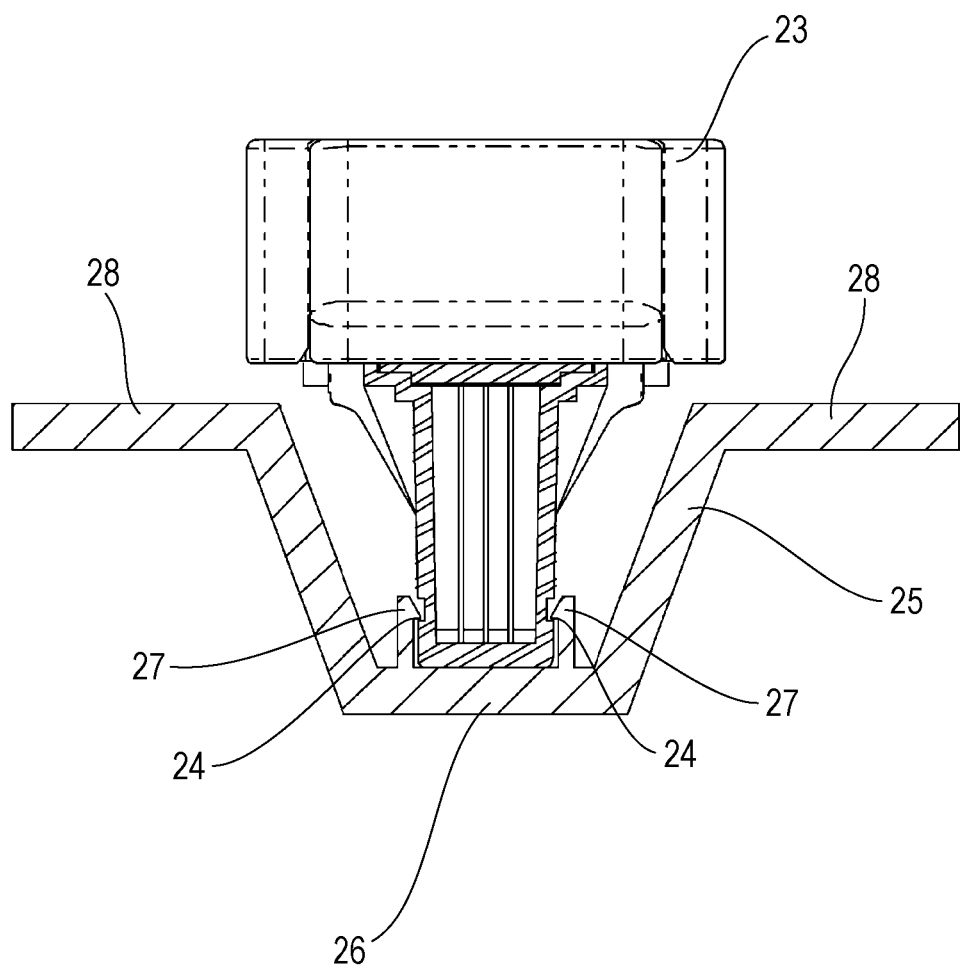
FIG. 13 is a cross-sectional view of a main part of the gas flowmeter according to the third exemplary embodiment of the present invention.
Figure 14:
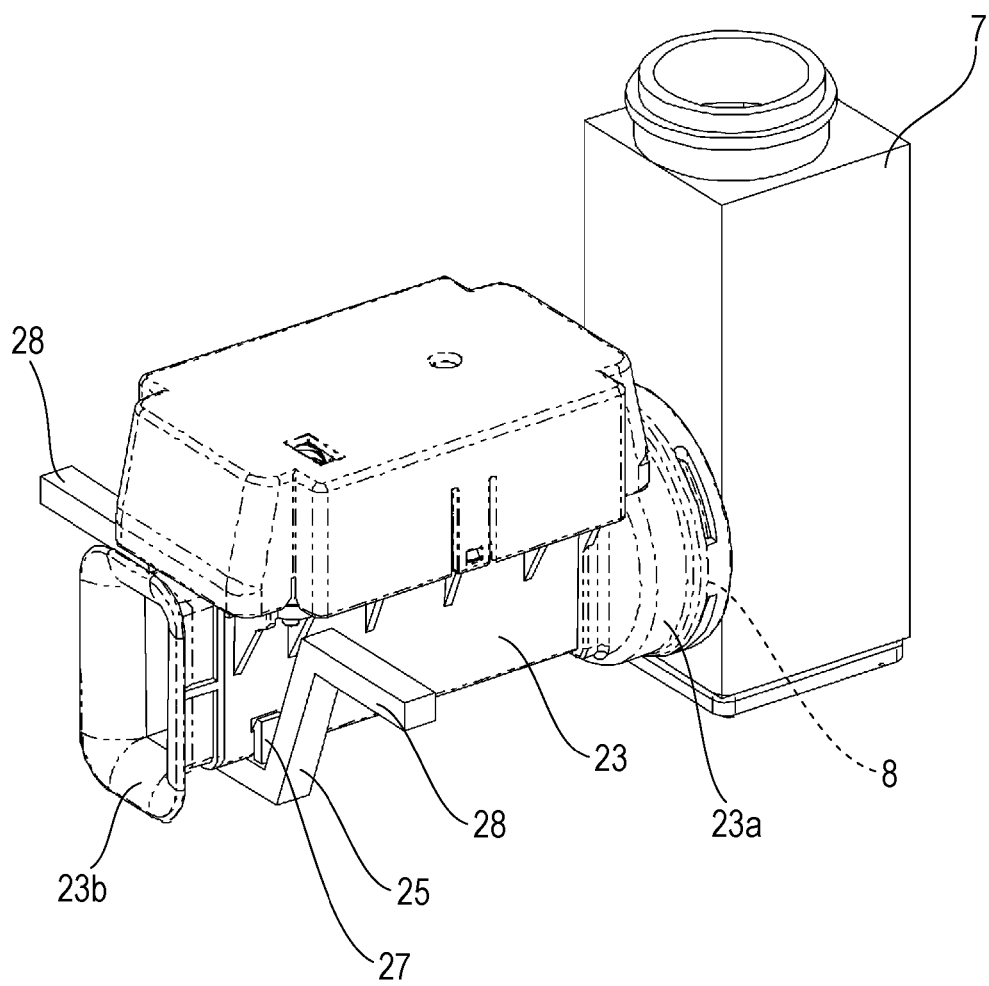
FIG. 14 is a perspective view of a main part of the gas flowmeter according to the third exemplary embodiment of the present invention.
Figure 15:
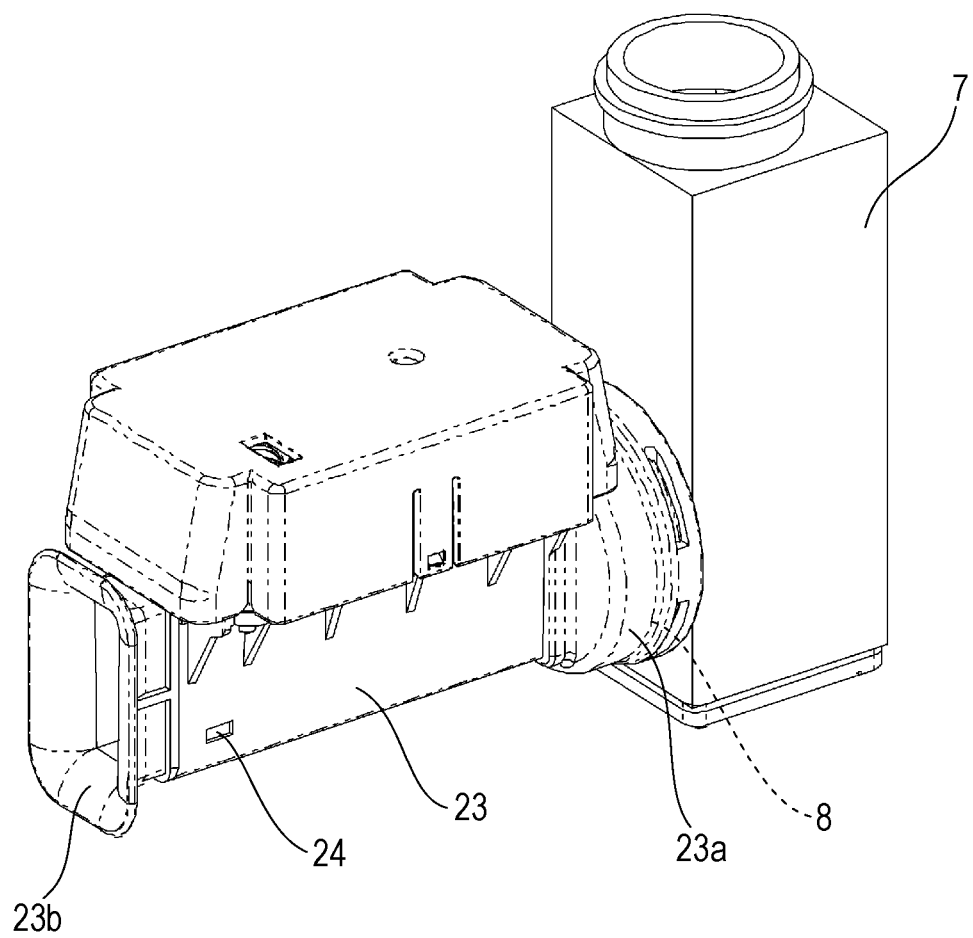
FIG. 15 is a perspective view of the main part of the gas flowmeter according to the third exemplary embodiment of the present invention.
Figure 16:
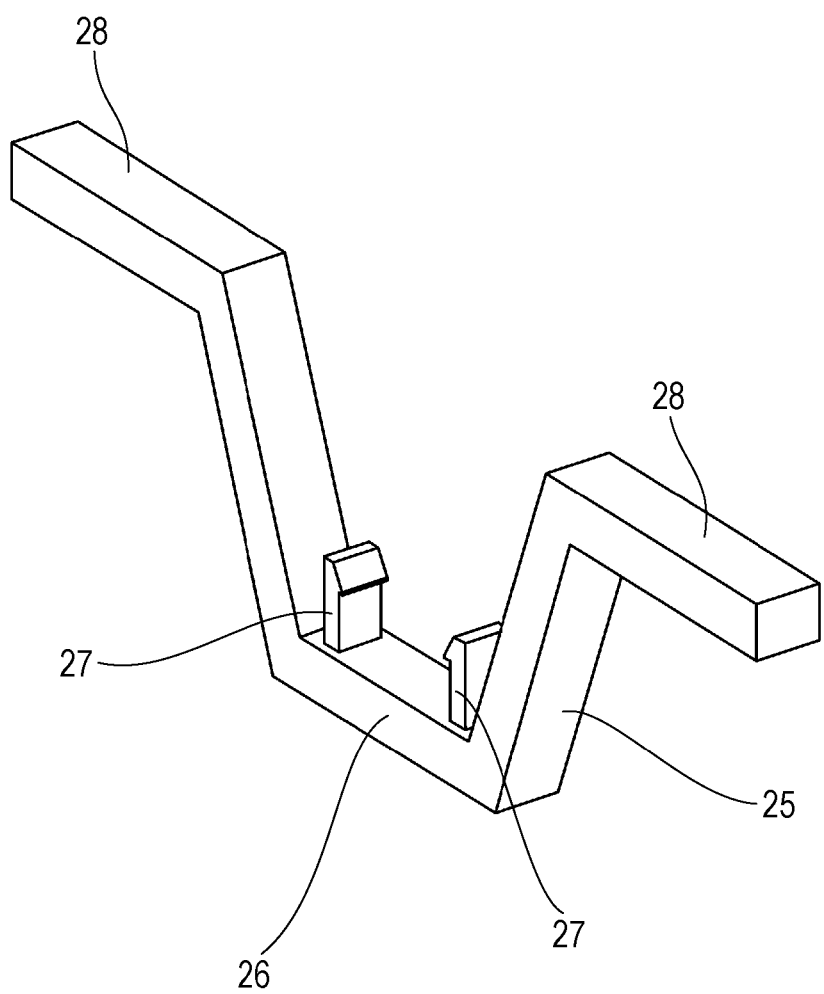
FIG. 16 is a perspective view of a support member of the gas flowmeter according to the third exemplary embodiment of the present invention.

FIG. 12 is a cross-sectional view of a gas flowmeter according to the third exemplary embodiment of the present invention. FIG. 13 is a cross-sectional view of a main part of the gas flowmeter. FIG. 14 is a perspective view of a main part of the gas flowmeter. FIG. 15 is a perspective view of the main part of the gas flowmeter. FIG. 16 is a perspective view of a support member of the gas flowmeter.

In the third exemplary embodiment, ultrasonic flow rate measuring unit 23 has locking recessed portions 24 on lower portions of both side surfaces thereof on an inflow port 23b side. Support member 25 has fixing portion 26 on a center portion thereof, and has locking pawls 27 on a left side and a right side of an upper surface of fixing portion 26. Locking pawls 27 engage with locking recessed portions 24 of ultrasonic flow rate measuring unit 23. Support arms 28 are formed on support member 25 such that support arms 28 extend outward from both sides of fixing portion 26.

In the above configuration, ultrasonic flow rate measuring unit 23 is fixed to support member 25 by making locking recessed portions 24 engage with locking pawls 27 formed on fixing portion 26 of support member 25.

In the third exemplary embodiment, a method of mounting ultrasonic flow rate measuring unit 23 on the gas flowmeter and the manner of operation and advantageous effects of the gas flowmeter after integrally mounting support member 25 on ultrasonic flow rate measuring unit 23 by fixing are substantially similar to those of the second exemplary embodiment. Accordingly, the description of the method of mounting ultrasonic flow rate measuring unit 23 and the manner of operation and advantageous effects of the gas flowmeter of this exemplary embodiment is omitted.

As described above, in this exemplary embodiment, the fixing portion 26 has locking pawls 27 on a left side and a right side of an upper surface of the fixing portion. Ultrasonic flow rate measuring unit 23 has locking recessed portions 24 on lower portions of both side surfaces of the ultrasonic flow rate measuring unit. Ultrasonic flow rate measuring unit 23 is locked by making locking pawls 27 and locking recessed portions 24 engage with each other. With such a configuration, assembling operability can be enhanced and a gas flowmeter can be manufactured at a low cost.

Fourth Exemplary Embodiment

Hereinafter, the fourth exemplary embodiment of the present invention is described with reference to FIG. 17 to FIG. 21. Parts having an identical configuration with the corresponding parts of the first exemplary embodiment to the third exemplary embodiment are given same symbols and the description of these parts is omitted.

Figure 17:
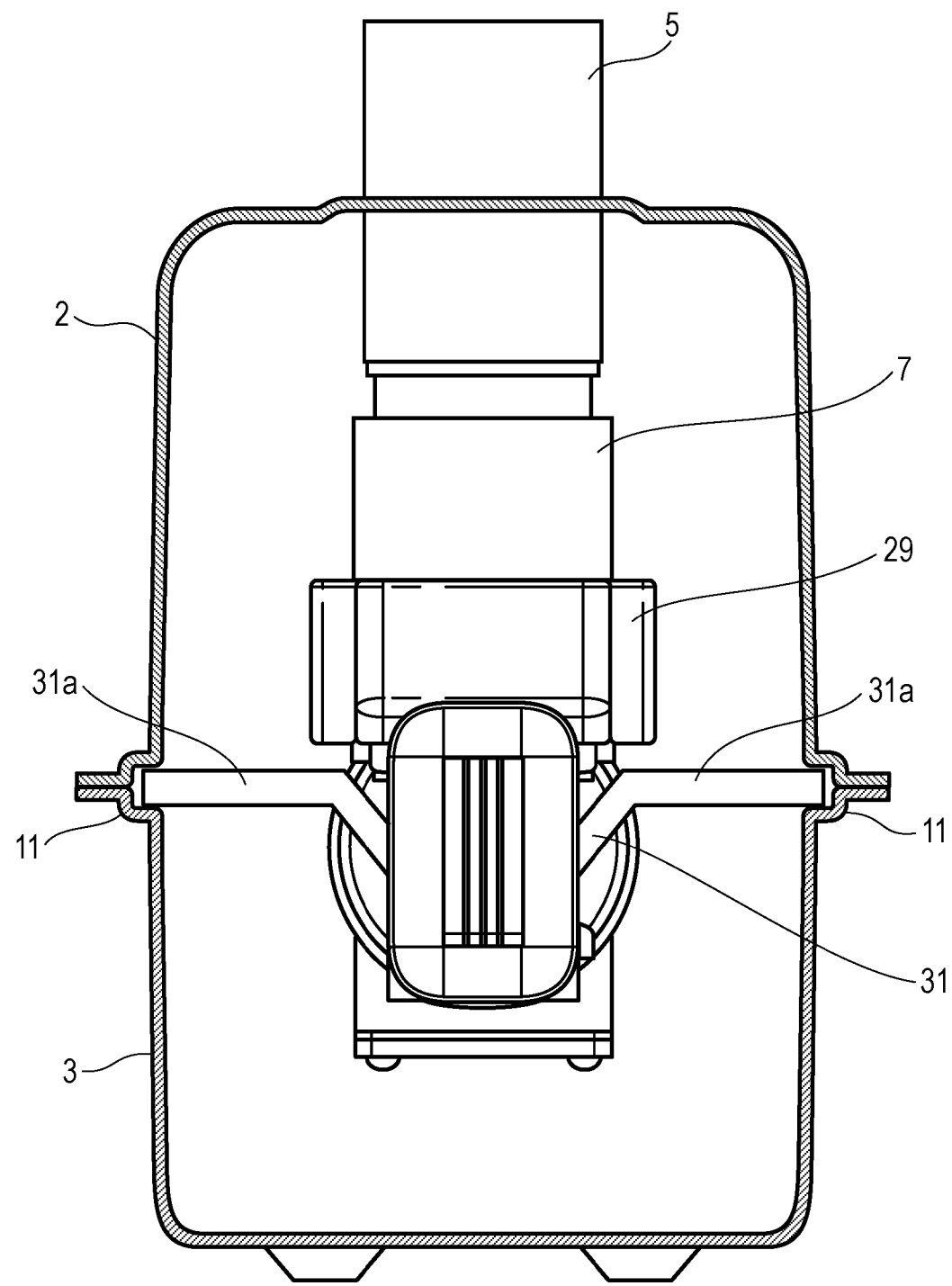
FIG. 17 is a cross-sectional view of a gas flowmeter according to a fourth exemplary embodiment of the present invention.
Figure 18:
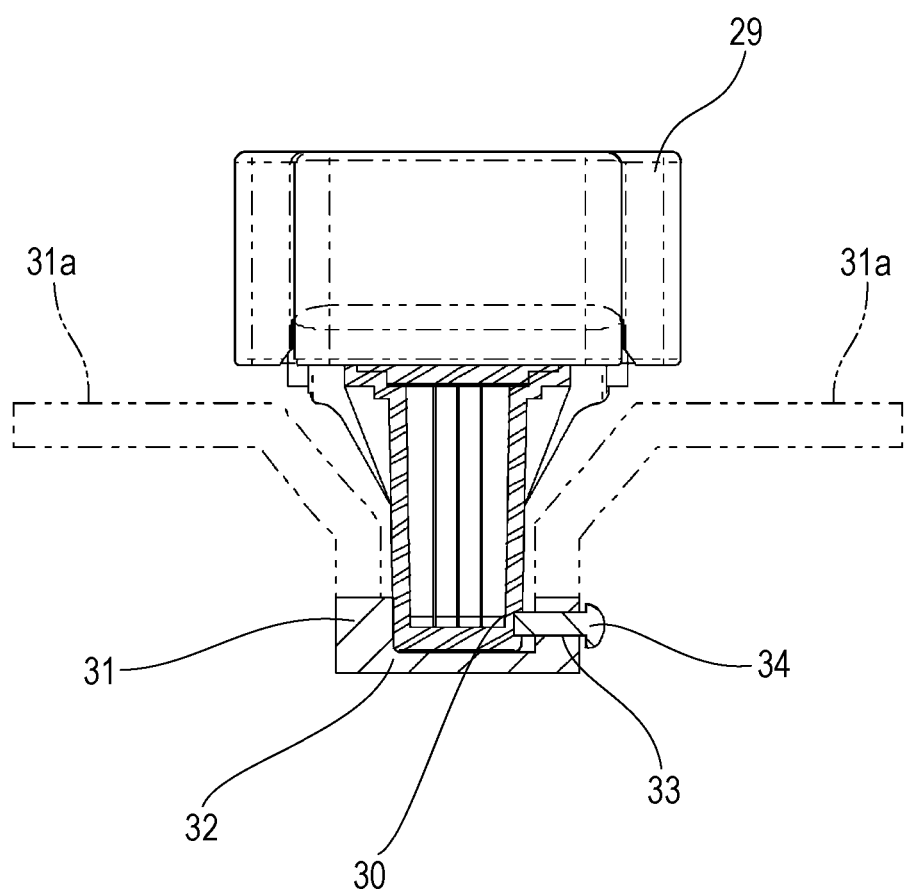
FIG. 18 is a cross-sectional view of a main part of the gas flowmeter according to the fourth exemplary embodiment of the present invention.
Figure 19:
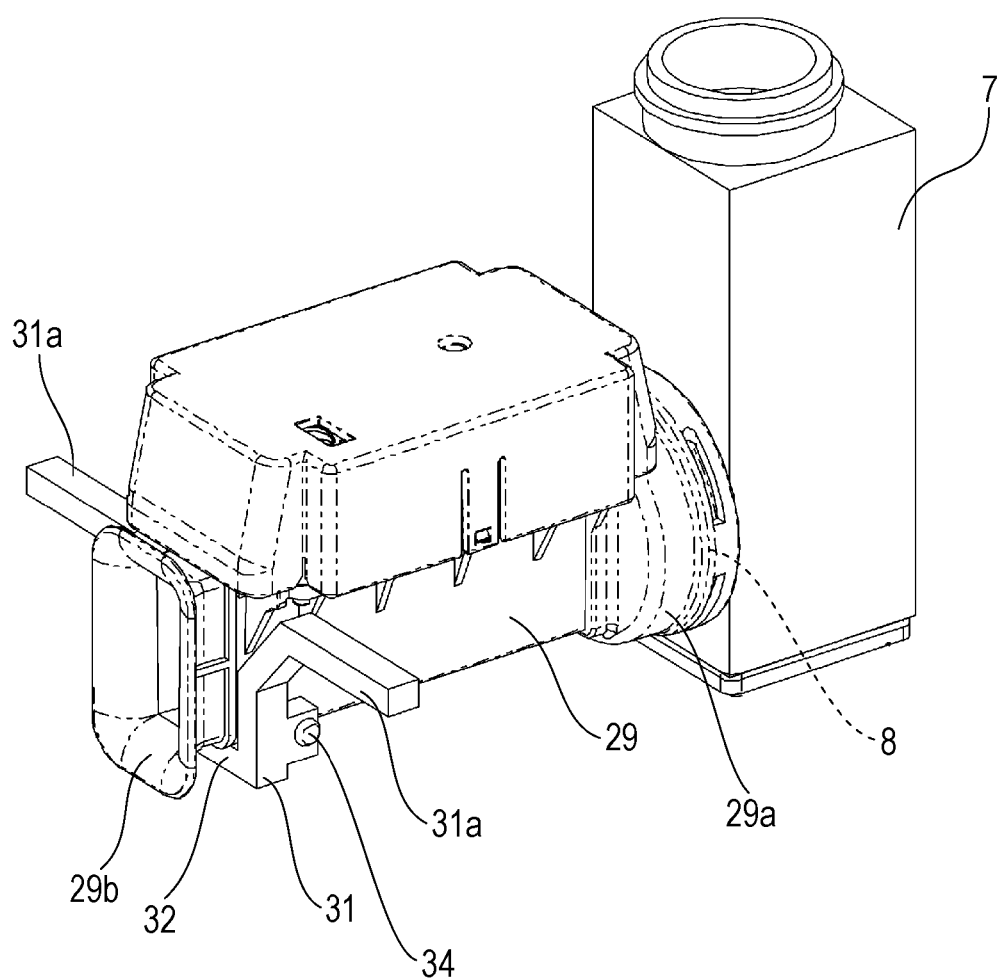
FIG. 19 is a perspective view of a main part of the gas flowmeter according to the fourth exemplary embodiment of the present invention.
Figure 20:
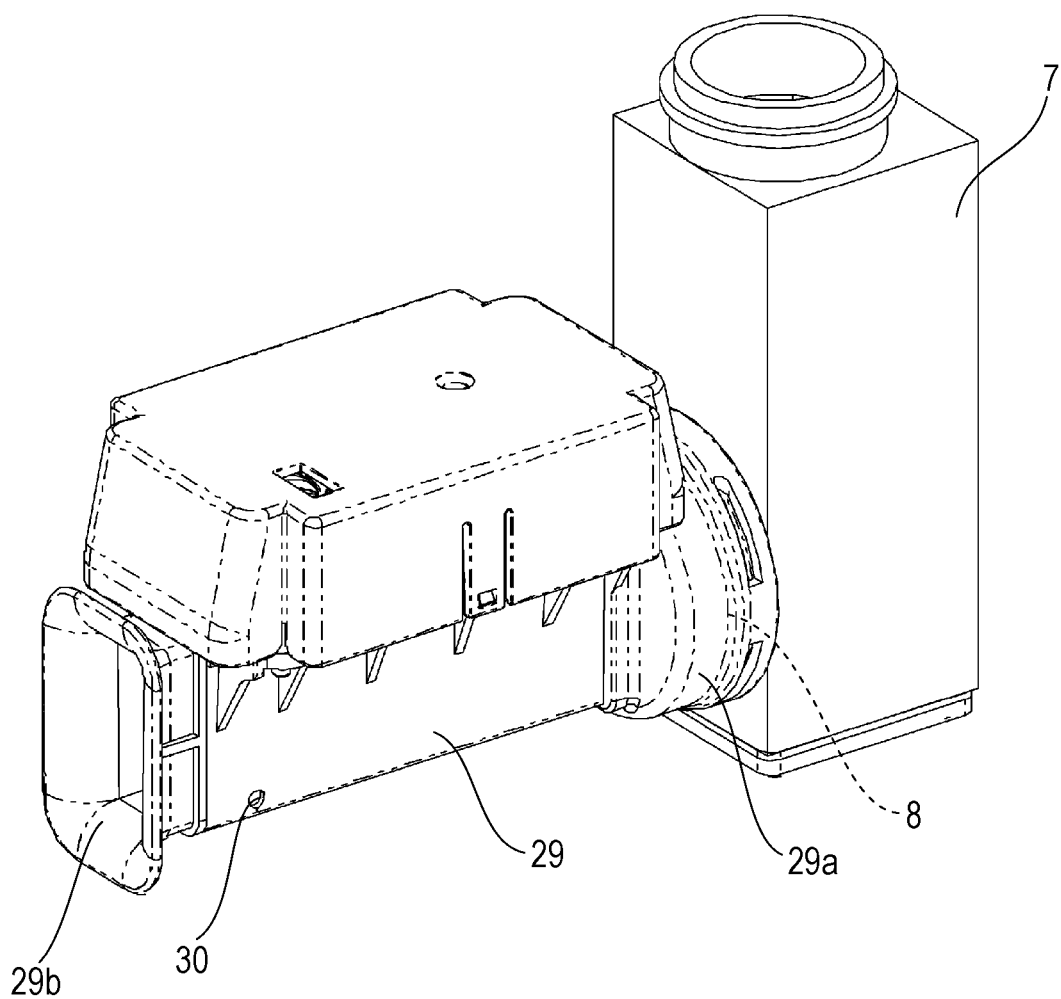
FIG. 20 is a perspective view of the main part of the gas flowmeter according to the fourth exemplary embodiment of the present invention.
Figure 21:
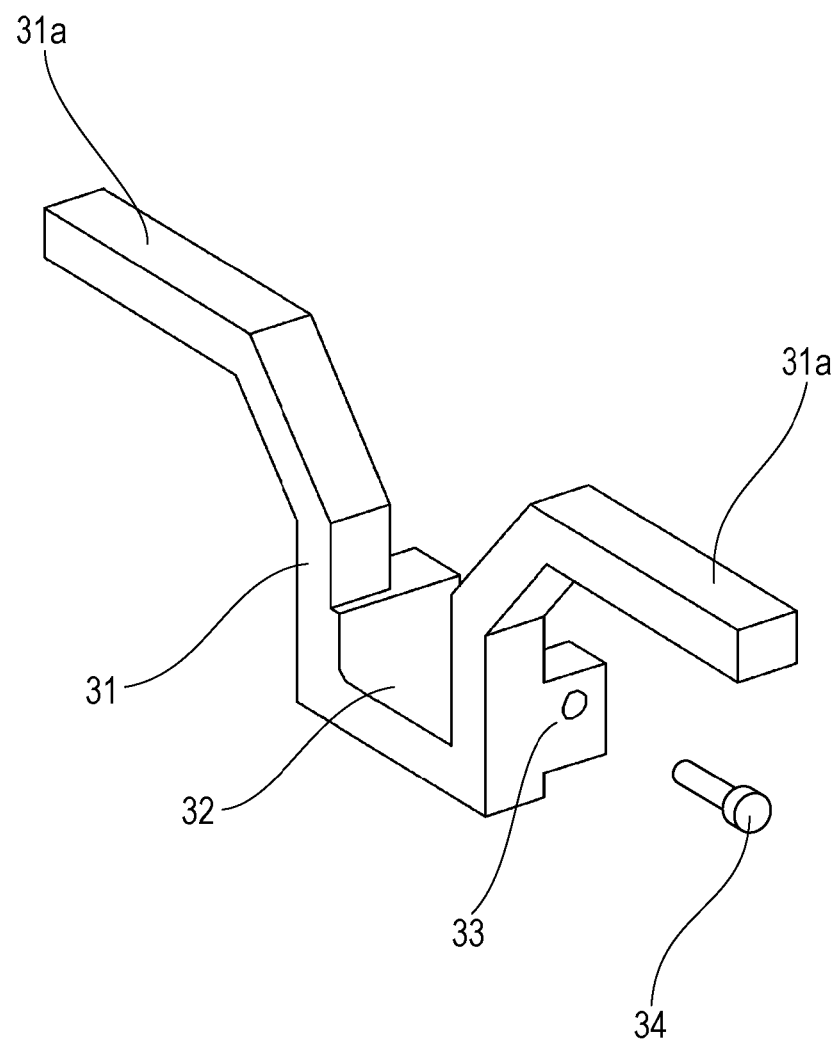
FIG. 21 is a perspective view of a support member of the gas flowmeter according to the fourth exemplary embodiment of the present invention.

FIG. 17 is a cross-sectional view of a gas flowmeter according to a fourth exemplary embodiment of the present invention. FIG. 18 is a cross-sectional view of a main part of the gas flowmeter. FIG. 19 is a perspective view of a main part of the gas flowmeter. FIG. 20 is a perspective view of the main part of the gas flowmeter. FIG. 21 is a perspective view of a support member of the gas flowmeter.

In the fourth exemplary embodiment, ultrasonic flow rate measuring unit 29 has locking recessed portion 30 on a lower portion of one side surface thereof on an inflow port 29b side. Support member 31 has fixing portion 32 on a center portion thereof, and has through hole 33 at a position where locking recessed portion 30 of ultrasonic flow rate measuring unit 29 is locked. By threadedly engaging bolt 34 into through hole 33 and by inserting a distal end of bolt 34 into locking recessed portion 30, support member 31 is fixed to ultrasonic flow rate measuring unit 29. Further, support member 31 is formed such that support arms 31a extend outward from both sides of fixing portion 32.

In the above configuration, support member 31 is fixed to ultrasonic flow rate measuring unit 29 by threadedly engaging bolt 34 into through hole 33 and by inserting a distal end of bolt 34 into locking recessed portion 30.

In the fourth exemplary embodiment, a method of mounting ultrasonic flow rate measuring unit 29 on the gas flowmeter and the manner of operation and advantageous effects of the gas flowmeter after integrally mounting support member 31 on ultrasonic flow rate measuring unit 29 by fixing are substantially similar to those of the second exemplary embodiment. Accordingly, the description of the method of mounting ultrasonic flow rate measuring unit 29 and the manner of operation and advantageous effects of the gas flowmeter of this exemplary embodiment is omitted.

As described above, in this exemplary embodiment, ultrasonic flow rate measuring unit 29 has locking recessed portion 30 on the side surface of the ultrasonic flow rate measuring unit, and support member 31 has through hole 33. Bolt 34 threadedly engages with through hole 33, and a distal end of bolt 34 is inserted into engaging recessed portion 30. With such a configuration, assembling operability can be enhanced and a gas flowmeter can be manufactured at a low cost.

Fifth Exemplary Embodiment

Hereinafter, the fifth exemplary embodiment of the present invention is described with reference to FIG. 22 to FIG. 25. Parts having an identical configuration with the corresponding parts of the first exemplary embodiment are given same symbols and the description of these parts is omitted.

Figure 22:
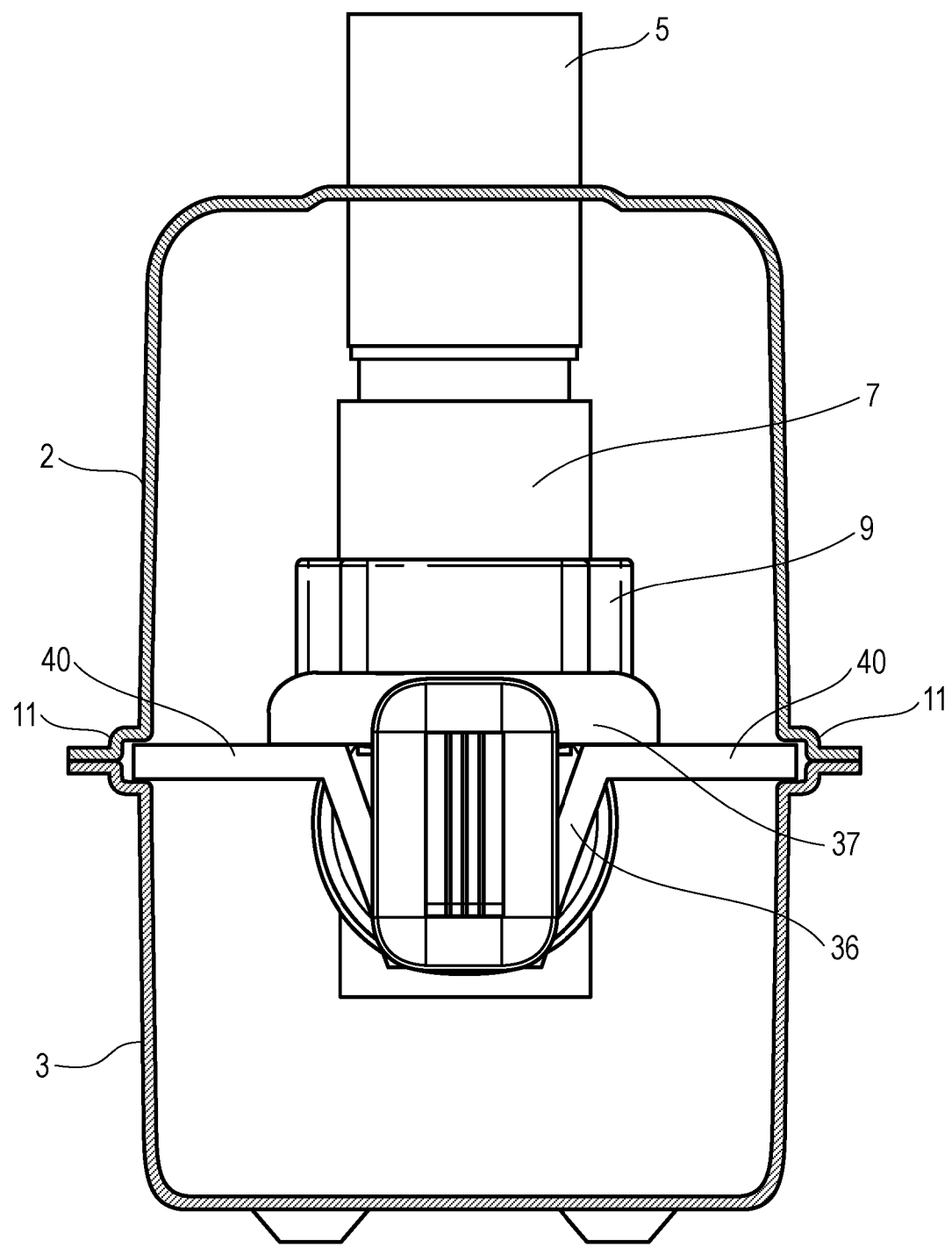
FIG. 22 is a cross-sectional view of a gas flowmeter according to a fifth exemplary embodiment of the present invention.
Figure 23:
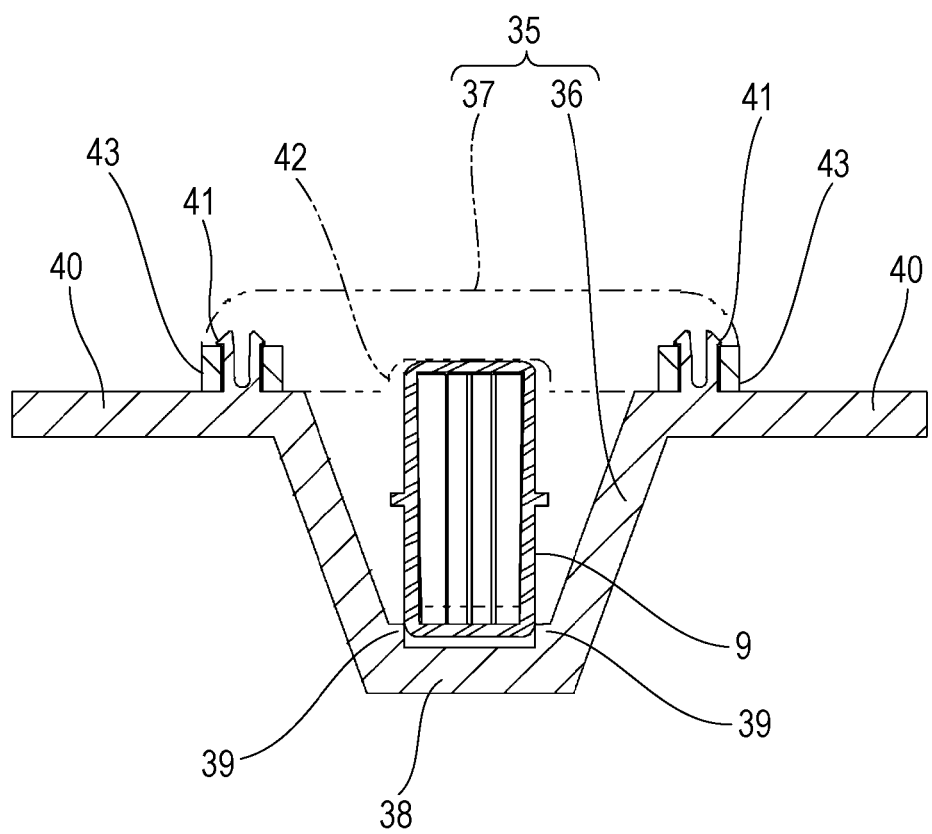
FIG. 23 is a cross-sectional view of a main part of the gas flowmeter according to the fifth exemplary embodiment of the present invention.
Figure 24:
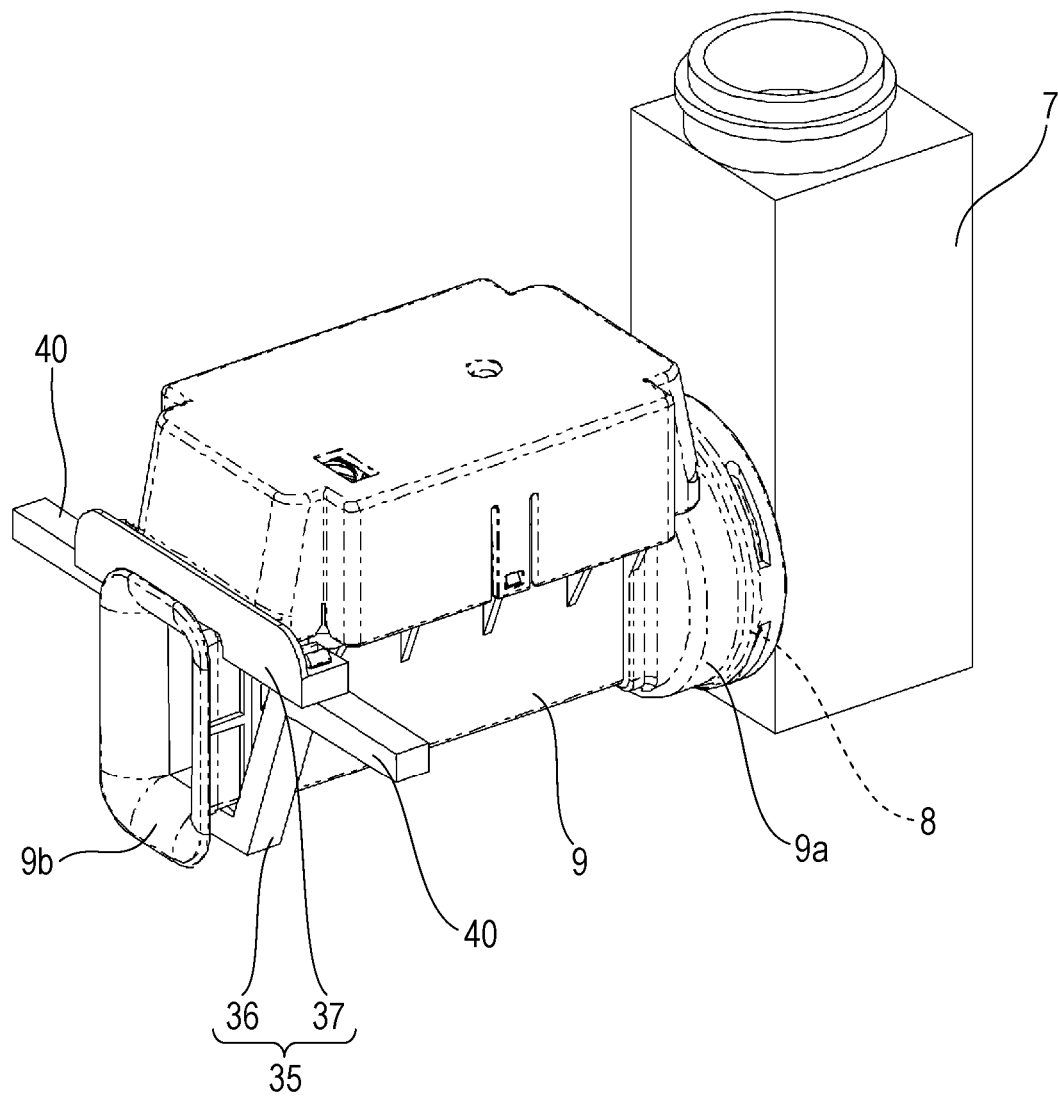
FIG. 24 is a perspective view of a main part of the gas flowmeter according to the fifth exemplary embodiment of the present invention.
Figure 25:
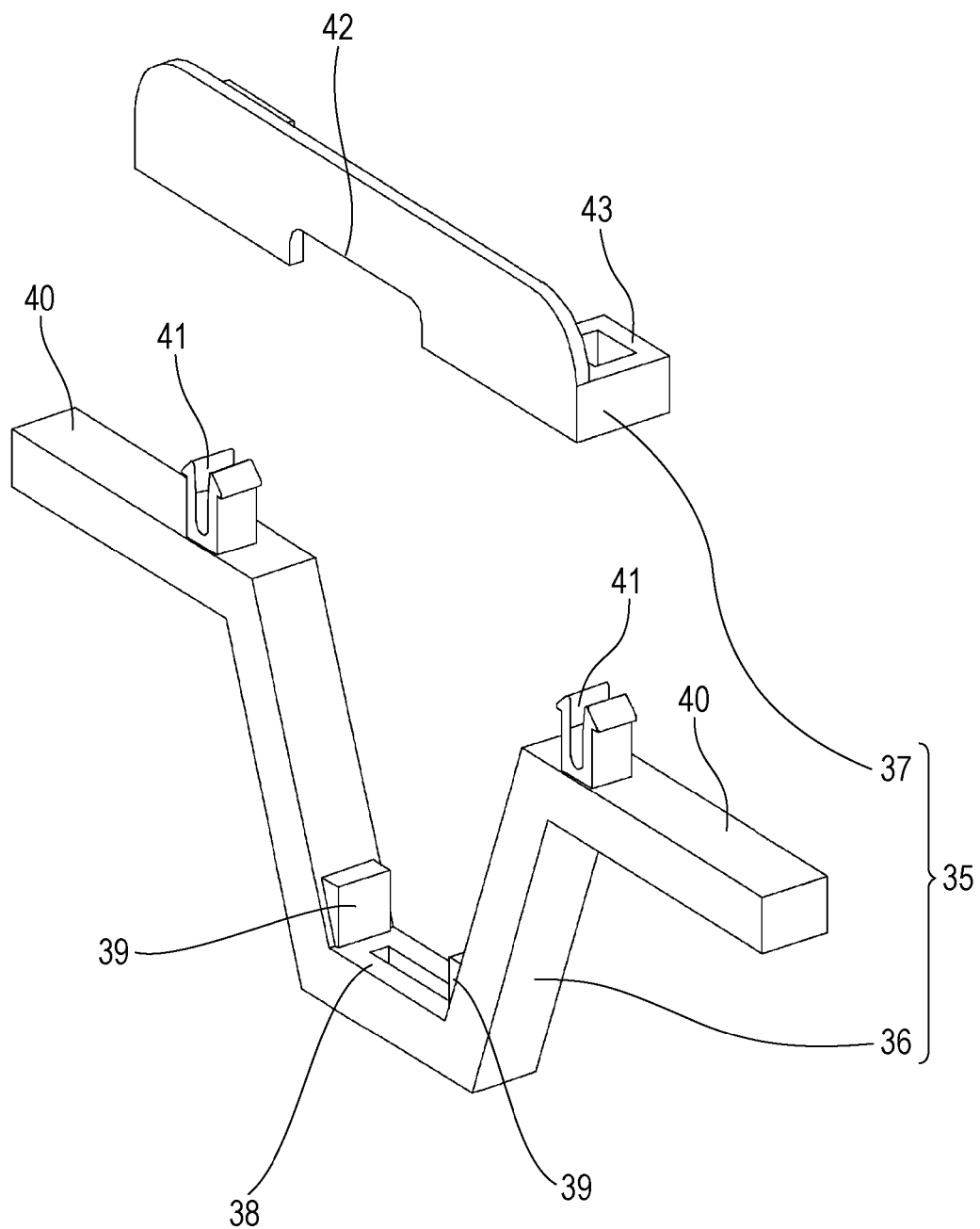
FIG. 25 is a perspective view of a support member of the gas flowmeter according to the fifth exemplary embodiment of the present invention.

FIG. 22 is a cross-sectional view of a gas flowmeter according to the fifth exemplary embodiment of the present invention. FIG. 23 is a cross-sectional view of a main part of the gas flowmeter. FIG. 24 is a perspective view of a main part of the gas flowmeter. FIG. 25 is a perspective view of a support member.

In the fifth exemplary embodiment, support member 35 holds an inflow port 9b side of ultrasonic flow rate measuring unit 9 on holding portion 11 of device body 1. Support member 35 includes lower support member 36 and upper support member 37 which sandwich ultrasonic flow rate measuring unit 9 from above and below.

Lower support member 36 has fixing portion 38 which fixes ultrasonic flow rate measuring unit 9 to an upper surface of a center portion thereof. Fixing portion 38 has restricting portions 39 which positionally restrict both side surfaces of a lower portion of ultrasonic flow rate measuring unit 9. Further, support member 35 has support arms 40 extending outward on both sides thereof. Support member 35 also has locking pawls 41 extending upward from upper surfaces of support arms 40. Support arms 40 are positionally held by holding portions 11 formed on a contact portion between upper case 2 and lower case 3.

An upper portion of ultrasonic flow rate measuring unit 9 is inserted into a lower portion of a center portion of upper support member 37. Upper support member 37 has recessed portion 42 which positionally holds ultrasonic flow rate measuring unit 9. Upper support member 37 has locking hole portions 43 into which locking pawls 41 of lower support member 36 are inserted for locking on both sides thereof.

Next, the manner of operation of the gas flowmeter of the fifth exemplary embodiment is described.

As shown in FIG. 22 to FIG. 25, ultrasonic flow rate measuring unit 9 is temporarily fixed to a lower support member 36 using restricting portions 39 of lower support member 36 as guides. Locking pawls 41 are inserted and locked to locking hole portions 43 of upper support member 37. Ultrasonic flow rate measuring unit 9 is sandwiched between lower support member 36 and upper support member 37.

In such a state, outflow port 9a of ultrasonic flow rate measuring unit 9 is connected to mounting portion 8 of connecting pipe 7, and is fixed to mounting portion 8 by the fixing fitting (not shown in the drawing). Fixing of ultrasonic flow rate measuring unit 9 to mounting portion 8 may be performed using engaging pawls or the like. With the use of such a configuration, the fixing fitting can be abolished. Accordingly, assembling operability can be enhanced and a gas flowmeter can be manufactured at a low cost.

The state shown in FIG. 22 to FIG. 25 is a state where connecting pipe 7, ultrasonic flow rate measuring unit 9 and support member 35 are integrally formed with each other. With such a configuration, connecting pipe 7, ultrasonic flow rate measuring unit 9 and support member 35 can be handled as one unit. Accordingly, handling of the gas flowmeter can be enhanced, and assembling operability of device body 1 can be enhanced.

In assembling connecting pipe 7, ultrasonic flow rate measuring unit 9 and support member 35 which are integrally formed with each other into device body 1, upper case 2 is reversed. Then, connecting pipe 7 is connected to outlet pipe 5 fixed to upper case 2, and support arms 40 of support members 35 are temporarily held by holding portions 11 of upper case 2. Then, upper case 2 is covered by lower case 3, and peripheries of upper case 2 and lower case 3 are air-tightly sealed.

With such a configuration, in the gas flowmeter according to this exemplary embodiment, ultrasonic flow rate measuring unit 9 is held such that outflow port 9a is fixed to connecting pipe 7, and the inflow port 9b side is held by holding portion 11 of device body 1 by way of support member 10. Accordingly, ultrasonic flow rate measuring unit 9 can be held in a stable manner. As a result, the gas flowmeter can perform stable flow rate measurement by suppressing swinging of ultrasonic flow rate measuring unit 9.

In the above-mentioned description, ultrasonic flow rate measuring unit 9 is connected to connecting pipe 7 in a state where ultrasonic flow rate measuring unit 9 is supported by support member 35. As another configuration, ultrasonic flow rate measuring unit 9 may be supported by support member 35 after ultrasonic flow rate measuring unit 9 is connected to connecting pipe 7.

As described above, in this exemplary embodiment, support member 35 includes lower support member 36 and upper support member 37. Lower support member 36 has support arms 40 extending outward on both sides, and locking pawls 41 extending upward from upper surfaces of support arms 40. Upper support member 37 has locking hole portions 43 into which locking pawls 41 are inserted and locked. With such a configuration, the gas flowmeter can perform stable flow rate measurement by suppressing swinging of ultrasonic flow rate measuring unit 9.

Sixth Exemplary Embodiment

Hereinafter, the sixth exemplary embodiment of the present invention is described with reference to FIG. 26 to FIG. 29. Parts having an identical configuration with the corresponding parts of the first exemplary embodiment are given same symbols and the description of these parts is omitted.

Figure 26:
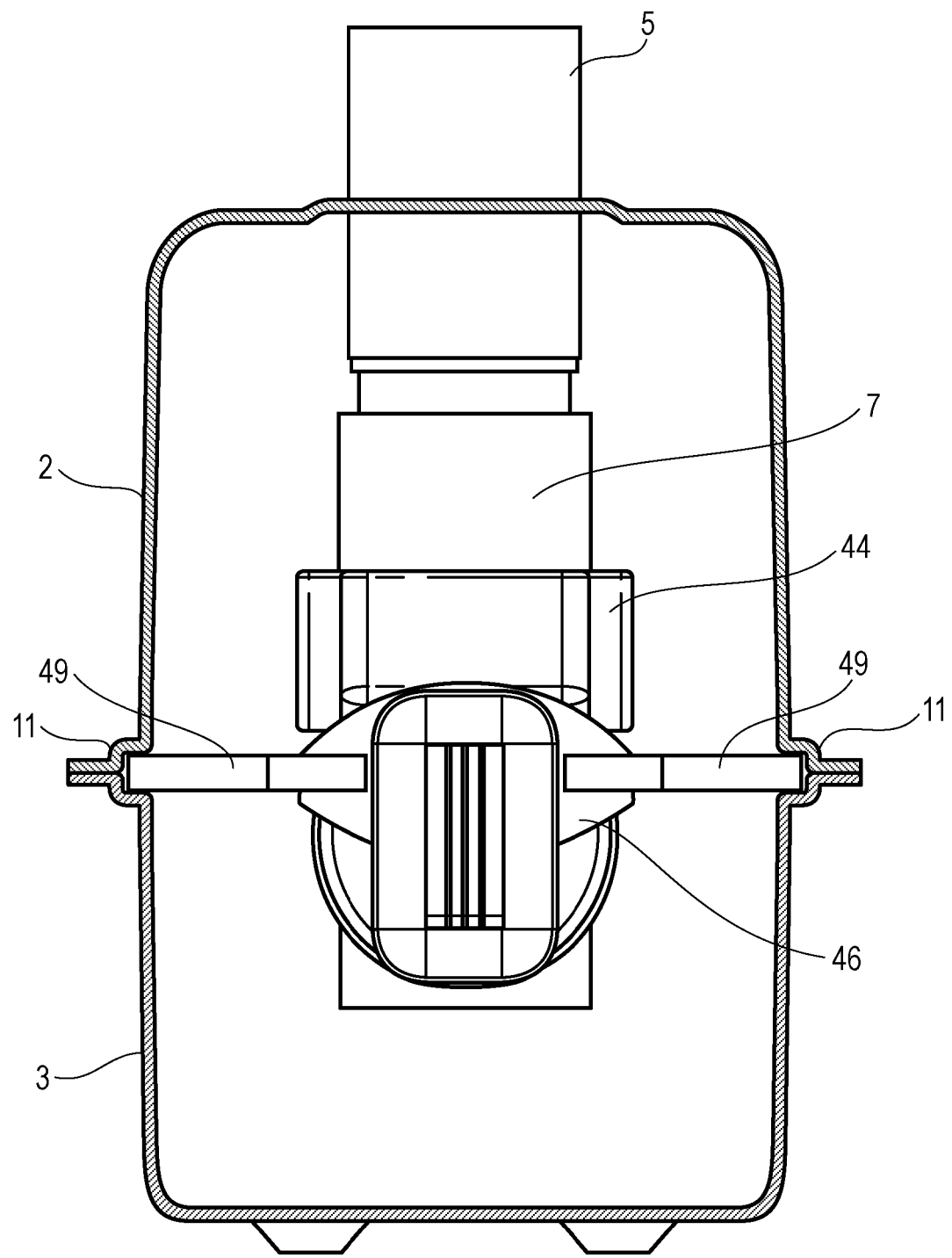
FIG. 26 is a cross-sectional view of a gas flowmeter according to a sixth exemplary embodiment of the present invention.
Figure 27:
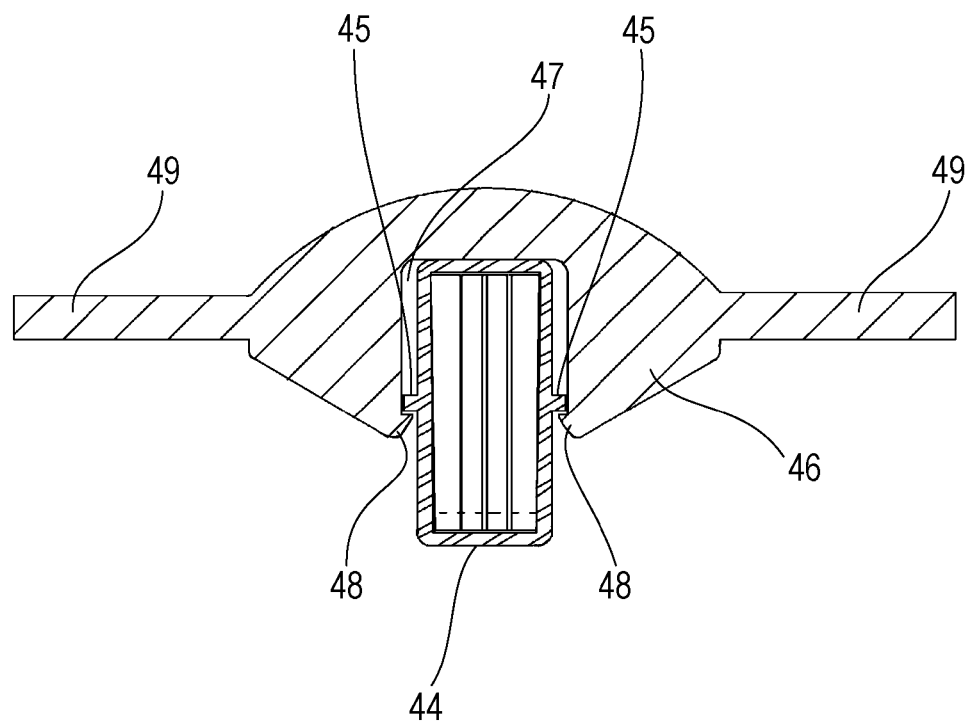
FIG. 27 is a cross-sectional view of a main part of the gas flowmeter according to the sixth exemplary embodiment of the present invention.
Figure 28:
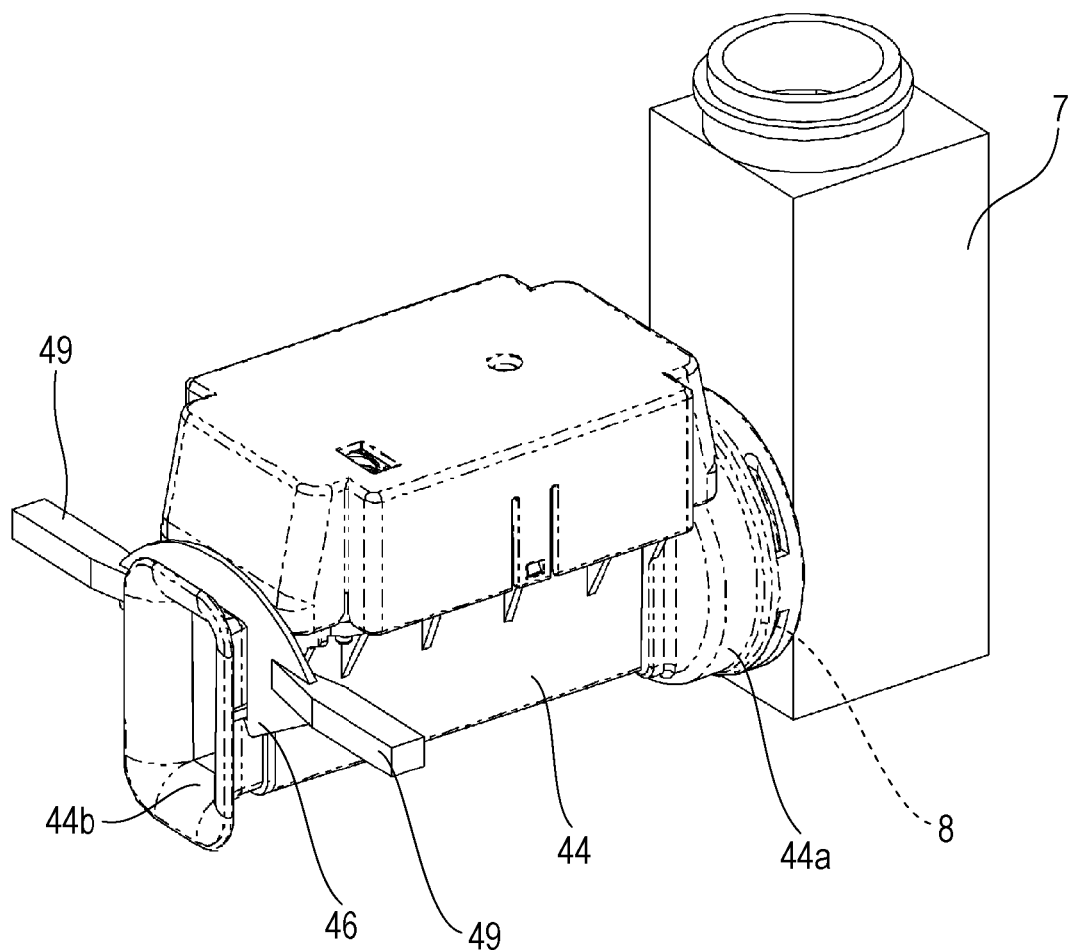
FIG. 28 is a perspective view of a main part of the gas flowmeter according to the sixth exemplary embodiment of the present invention.
Figure 29:
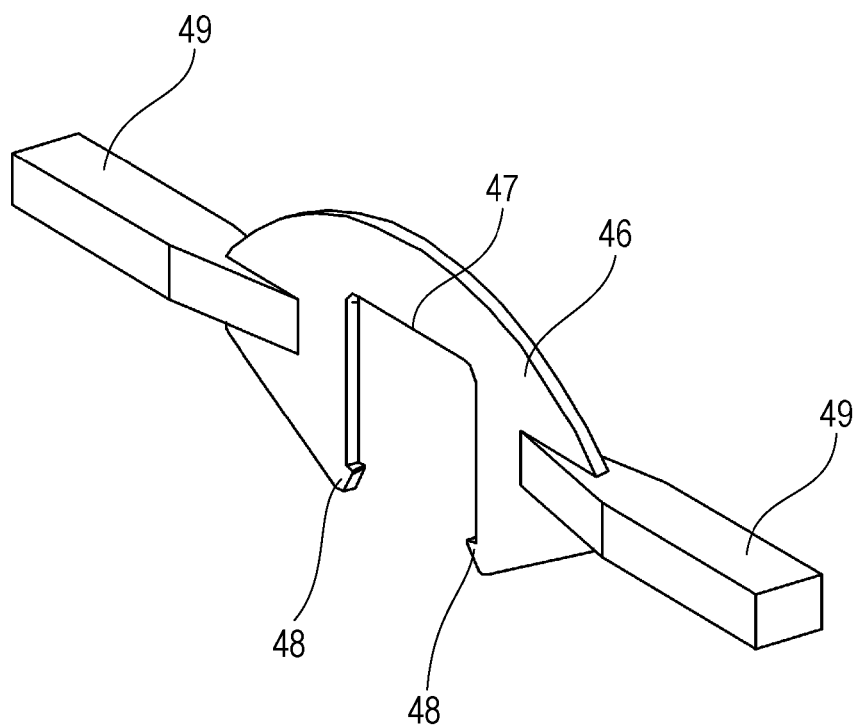
FIG. 29 is a perspective view of a support member of the gas flowmeter according to the sixth exemplary embodiment of the present invention.

FIG. 26 is a cross-sectional view of a gas flowmeter according to the sixth exemplary embodiment of the present invention. FIG. 27 is a cross-sectional view of a main part of the gas flowmeter. FIG. 28 is a perspective view of a main part of the gas flowmeter. FIG. 29 is a perspective view of a support member of the gas flowmeter.

In sixth exemplary embodiment, ultrasonic flow rate measuring unit 44 has locking projecting portions 45 on both side surfaces of the ultrasonic flow rate measuring unit. Support member 46 has recessed portion 47 into which an upper portion of ultrasonic flow rate measuring unit 44 on an inflow port 44b side is inserted. Support member 46 has locking pawls 48 which engage with locking projecting portions 45 of ultrasonic flow rate measuring unit 44 on both sides of a lower portion of recessed portion 47. Support arms 49 are mounted on both sides of support member 46 such that support arms 49 extend outward. Support arms 49 are positioned and held by holding portions 11 formed on the contact portion between upper case 2 and lower case 3.

In the above configuration, support member 46 is fixed to ultrasonic flow rate measuring unit 44 by making locking pawls 48 of support member 46 engage with locking projecting portions 45.

In the sixth exemplary embodiment, a method of mounting ultrasonic flow rate measuring unit 44 on the gas flowmeter and the manner of operation and advantageous effects of the gas flowmeter after integrally mounting the support member 46 on ultrasonic flow rate measuring unit 44 by fixing are substantially similar to those of the first exemplary embodiment. Accordingly, the description of the method of mounting ultrasonic flow rate measuring unit 44 and the manner of operation and advantageous effects of the gas flowmeter of this exemplary embodiment is omitted.

As described above, in this exemplary embodiment, ultrasonic flow rate measuring unit 44 has locking projecting portions 45 on both side surfaces of the ultrasonic flow rate measuring unit. Further, support member 46 has engaging pawls 48 which engage with locking projecting portions 45. With such a configuration, swinging of ultrasonic flow rate measuring unit 44 is suppressed and hence, stable flow rate measurement can be performed.

Seventh Exemplary Embodiment

Hereinafter, the seventh exemplary embodiment of the present invention is described with reference to FIG. 30 to FIG. 33. Parts having an identical configuration with the corresponding parts of the first exemplary embodiment to the sixth exemplary embodiment are given same symbols and the description of these parts is omitted.

Figure 30:
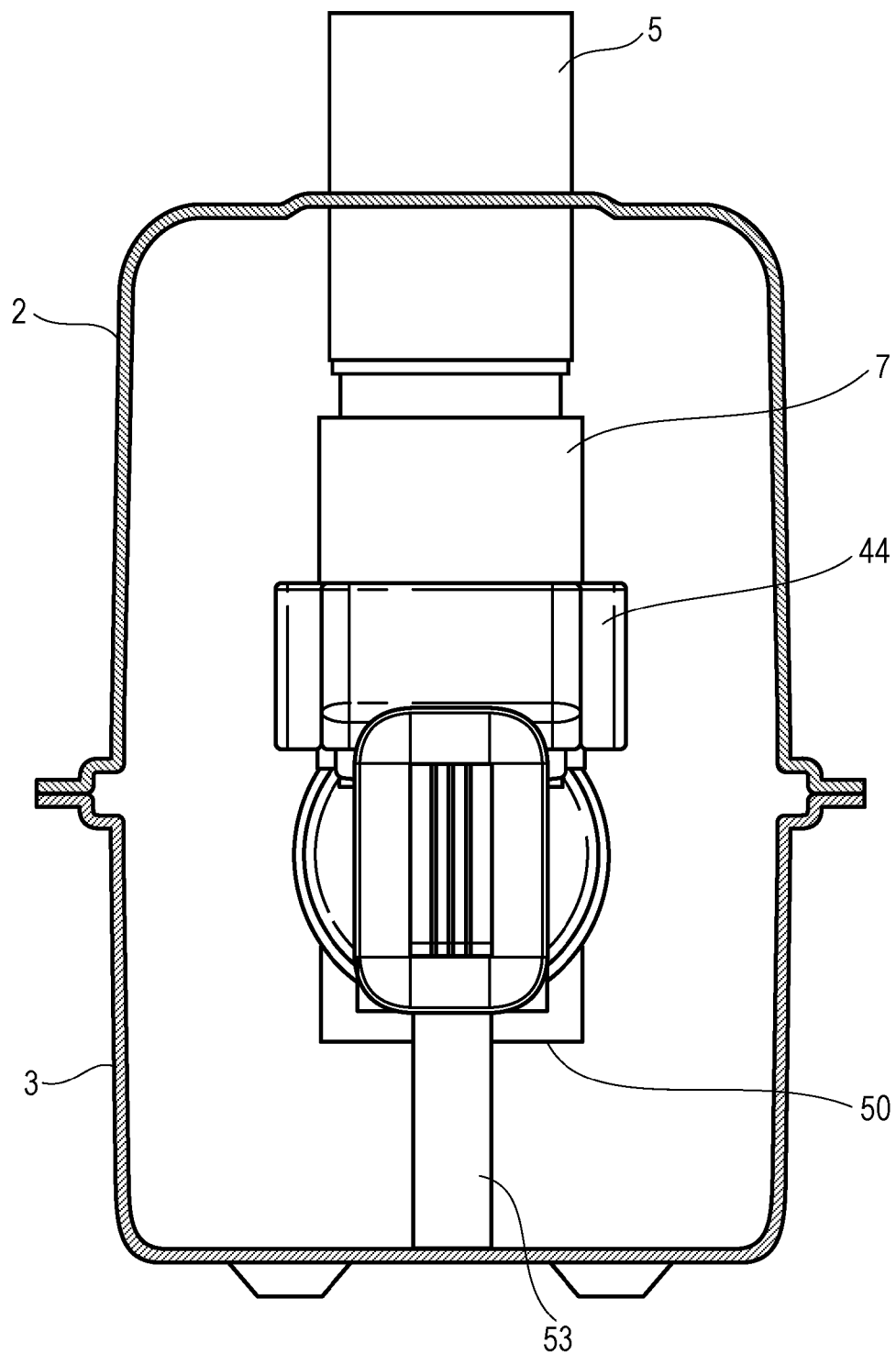
FIG. 30 is a cross-sectional view of a gas flowmeter according to a seventh exemplary embodiment of the present invention.
Figure 31:
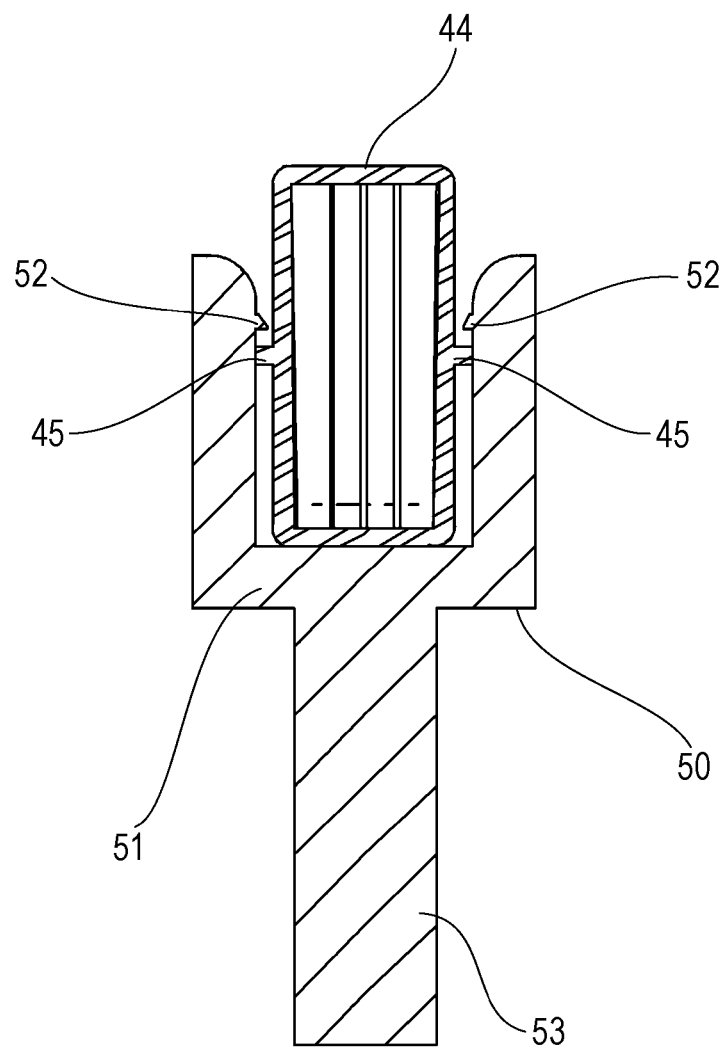
FIG. 31 is a cross-sectional view of a main part of the gas flowmeter according to the seventh exemplary embodiment of the present invention.
Figure 32:
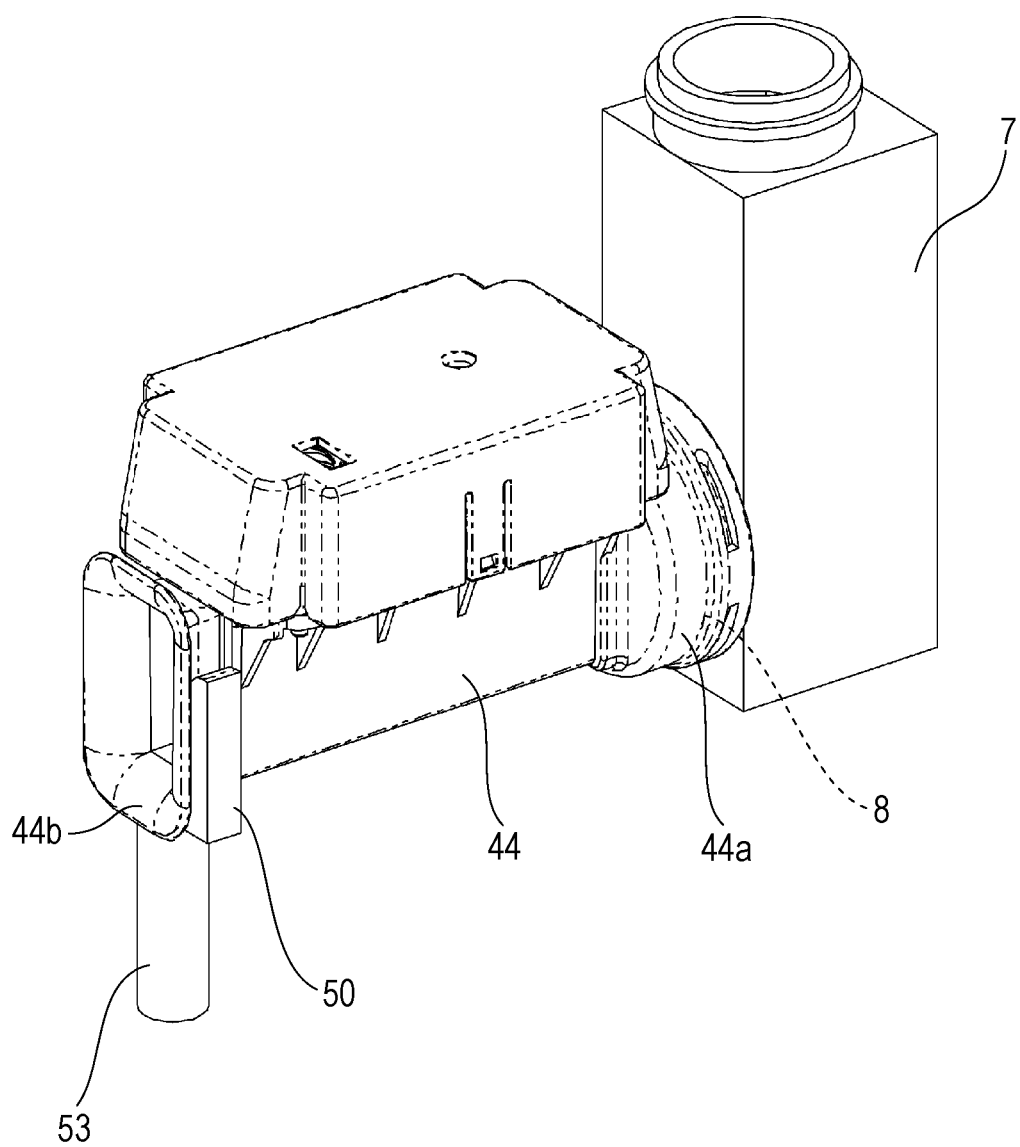
FIG. 32 is a perspective view of a main part of the gas flowmeter according to the seventh exemplary embodiment of the present invention.
Figure 33:
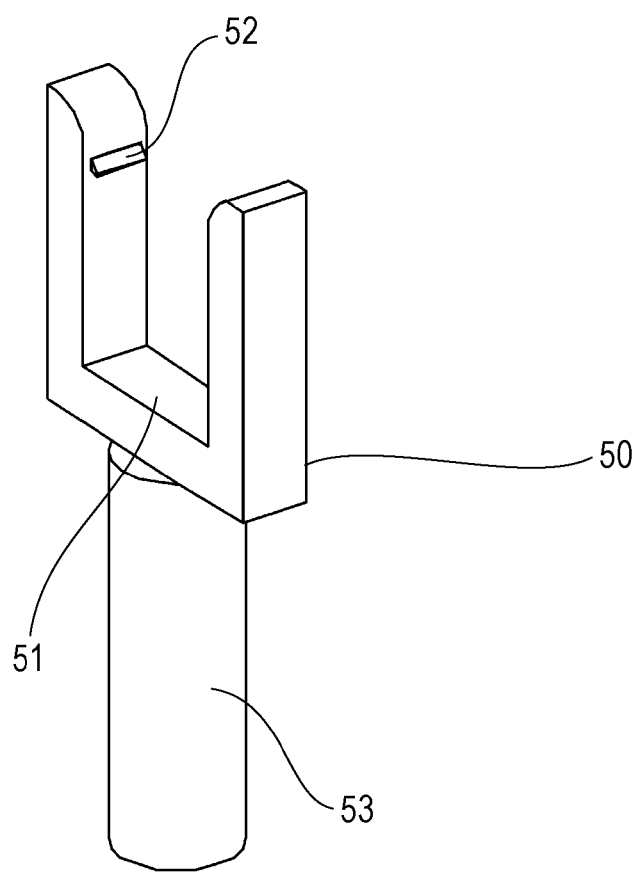
FIG. 33 is a perspective view of a support member of the gas flowmeter according to the seventh exemplary embodiment of the present invention.

FIG. 30 is a cross-sectional view of a gas flowmeter according to the seventh exemplary embodiment of the present invention. FIG. 31 is a cross-sectional view of a main part of the gas flowmeter. FIG. 32 is a perspective view of a main part of the gas flowmeter. FIG. 33 is a perspective view of a support member of the gas flowmeter.

In the seventh exemplary embodiment, support member 50 has fixing portion 51 which supports a lower portion of ultrasonic flow rate measuring unit 44 on an inflow port 44b side. Support member 50 has engaging pawls 52 which engage with locking projecting portions 45 of ultrasonic flow rate measuring unit 44 on both sides of an upper portion of fixing portion 51. Support member 50 has support leg 53 extending downward from fixing portion 51. Support member 50 positionally holds ultrasonic flow rate measuring unit 44 by bringing support leg 53 into contact with an inner bottom surface of lower case 3.

In the above configuration, ultrasonic flow rate measuring unit 44 fixes support member 50 by making engaging pawls 52 of fixing portion 51 of support member 50 engage with locking projecting portions 45. In ultrasonic flow rate measuring unit 44, support leg 53 of support member 50 is brought into contact with the inner bottom surface of lower case 3. With such a configuration, inflow port 44b is supported by support leg 53 and, at the same time, outflow port 44a is connected to mounting portion 8 of connecting pipe 7 and hence, ultrasonic flow rate measuring unit 44 is stably supported. With such a configuration, swinging of ultrasonic flow rate measuring unit 44 is suppressed and hence, stable flow rate measurement can be performed.

As described above, in this exemplary embodiment, ultrasonic flow rate measuring unit 44 has locking projecting portions 45 on both side surfaces thereof. Further, support member 50 has engaging pawls 52 which engage with locking projecting portions 45 and support leg 53 which extends downward from support member 50 and is brought into contact with the inner bottom surface of device body 1. With such a configuration, swinging of ultrasonic flow rate measuring unit 44 is suppressed and hence, stable flow rate measurement can be performed.

Eighth Exemplary Embodiment

Hereinafter, the eighth exemplary embodiment of the present invention is described with reference to FIG. 34 to FIG. 41. Parts having an identical configuration with the corresponding parts of the first exemplary embodiment to the seventh exemplary embodiment are given same symbols and the description of these parts is omitted.

Figure 34:
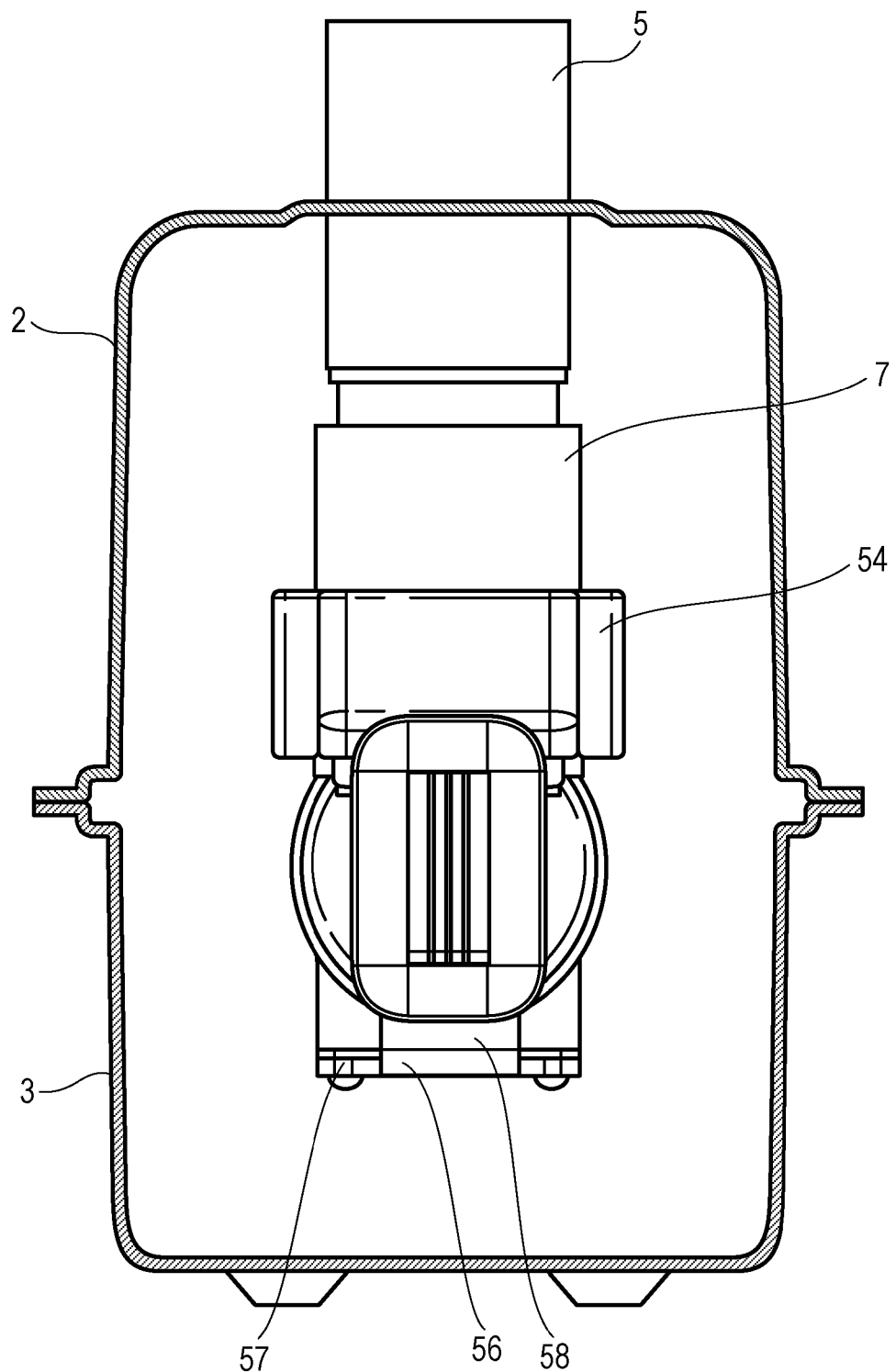
FIG. 34 is a cross-sectional view of a gas flowmeter according to an eighth exemplary embodiment of the present invention.
Figure 35:
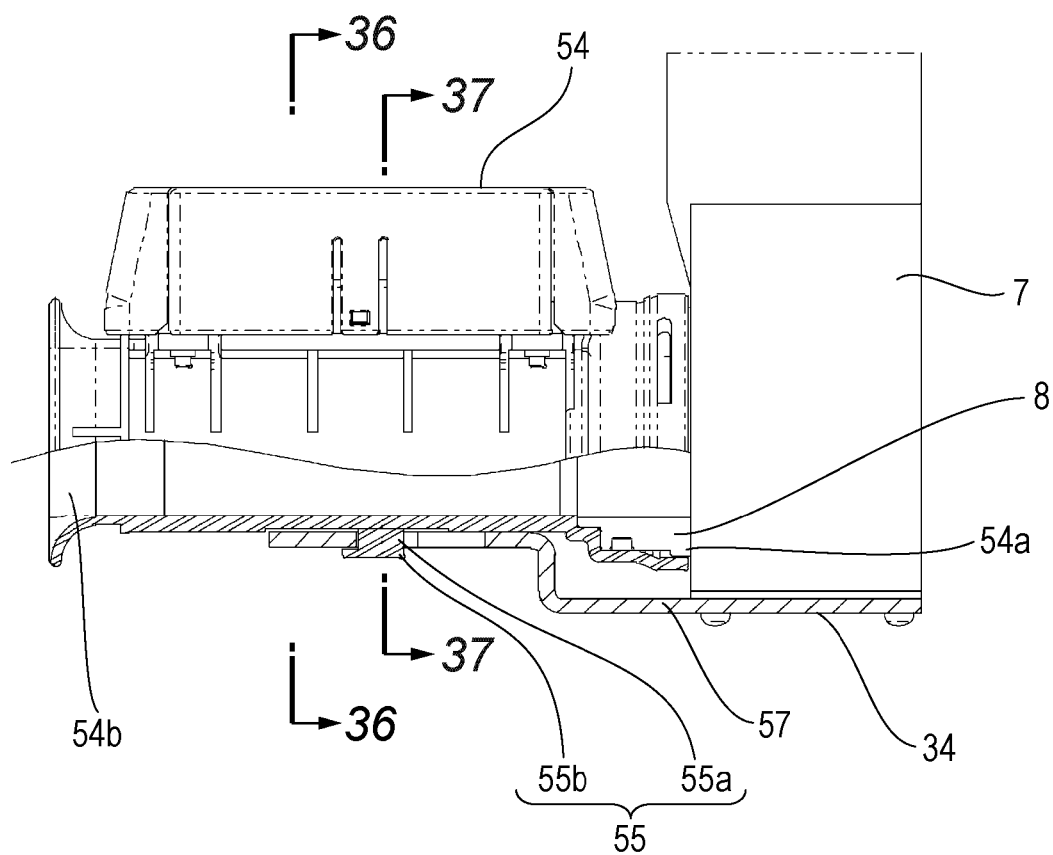
FIG. 35 is a cross-sectional view of a main part of the gas flowmeter according to the eighth exemplary embodiment of the present invention.
Figure 36:
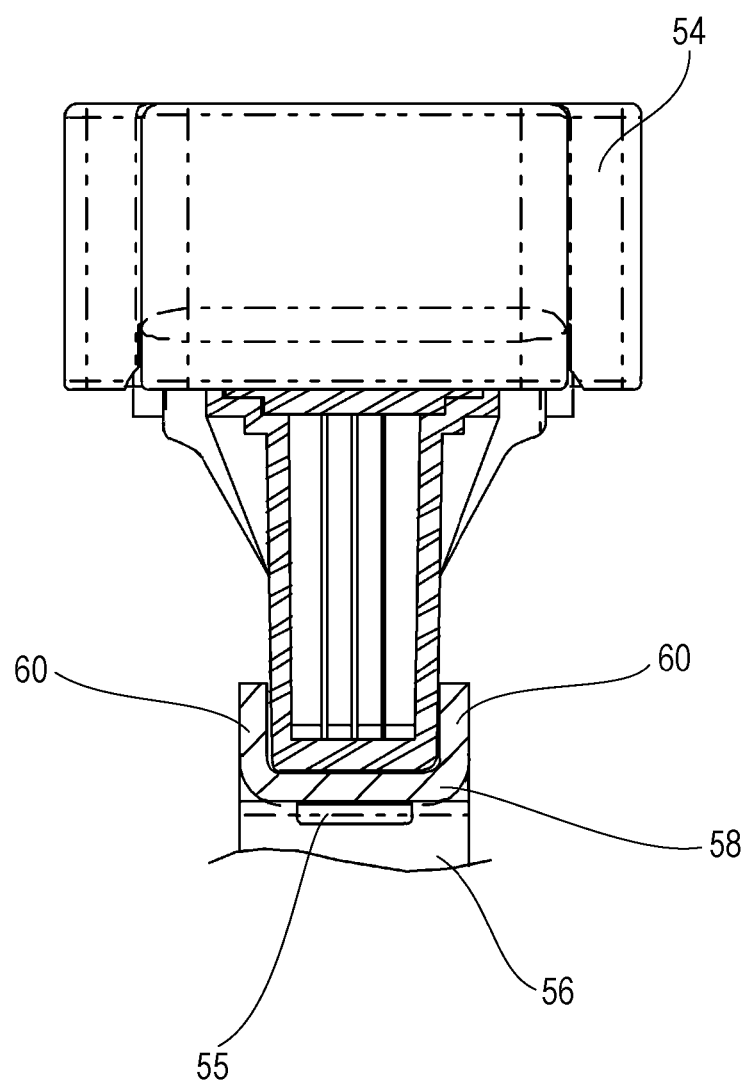
FIG. 36 is a cross-sectional view taken along line 36-36 in FIG. 35.
Figure 37:
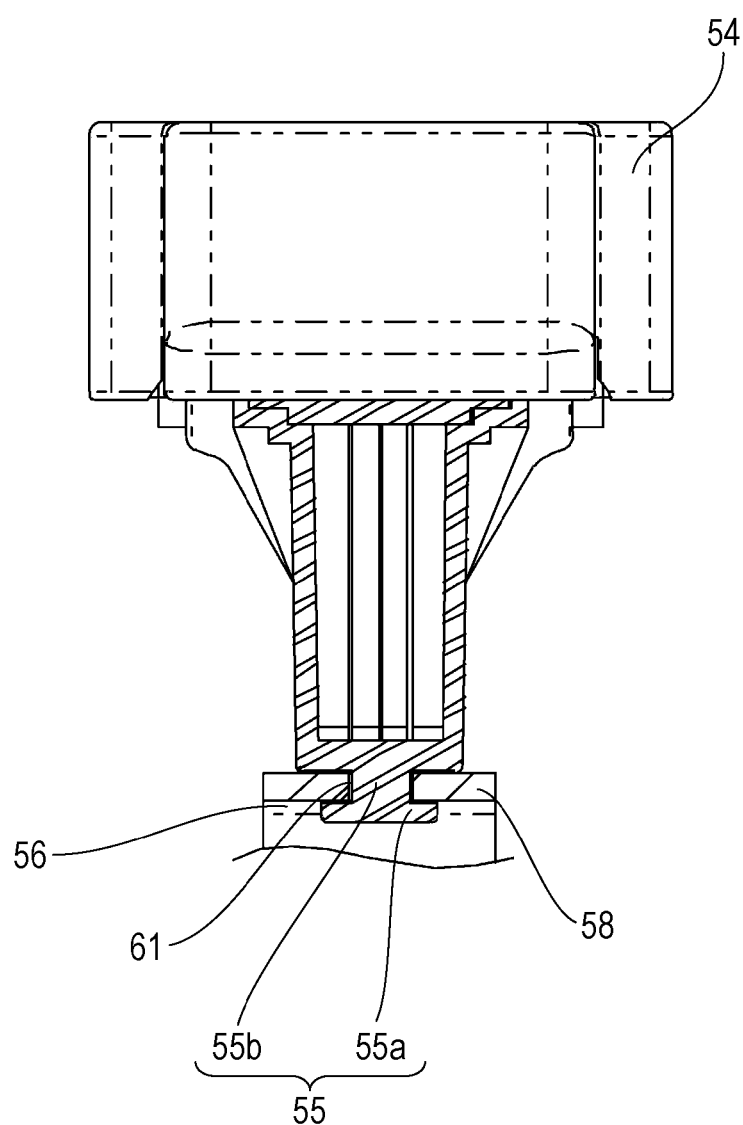
FIG. 37 is a cross-sectional view taken along line 37-37 in FIG. 35.
Figure 38:
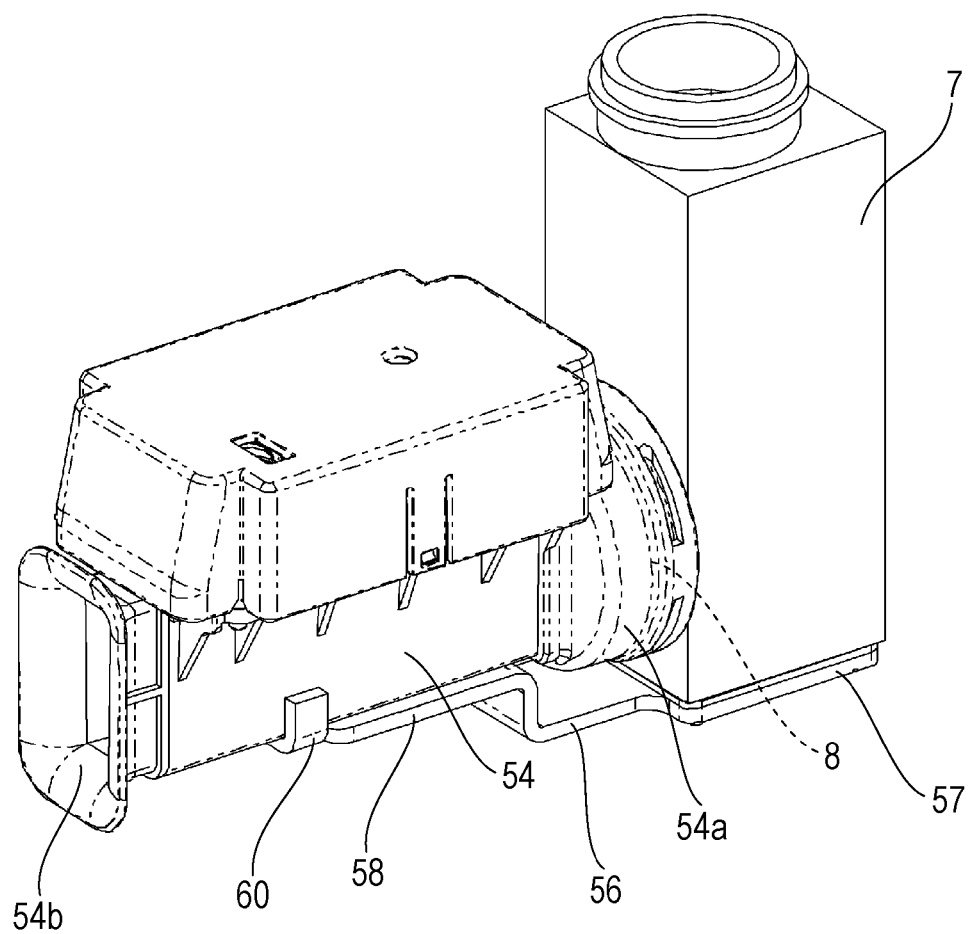
FIG. 38 is a perspective view of a main part of the gas flowmeter according to the eighth exemplary embodiment of the present invention.
Figure 39:
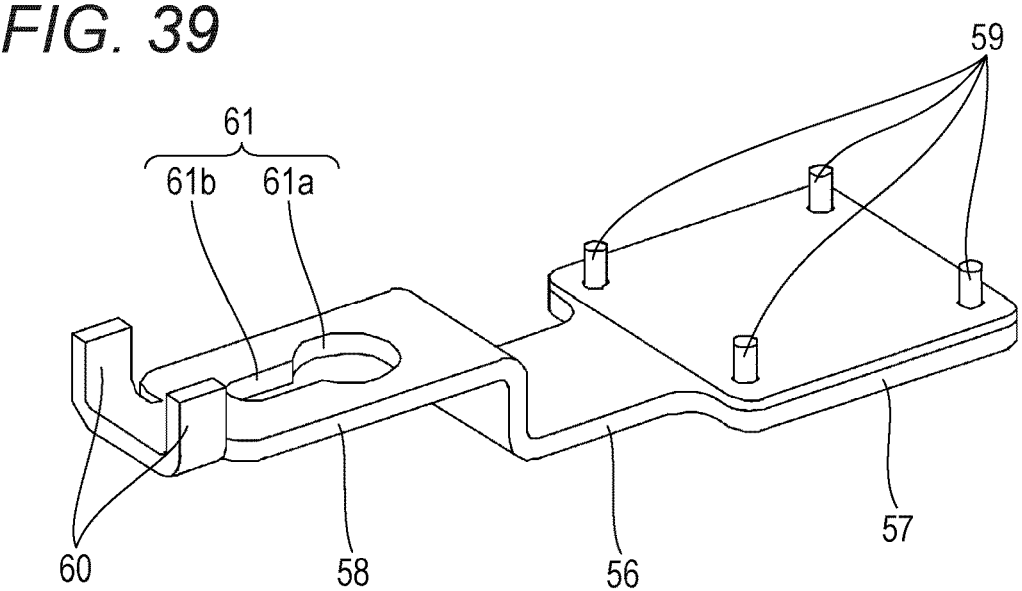
FIG. 39 is a perspective view of a support member of the gas flowmeter according to the eighth exemplary embodiment of the present invention.
Figure 40:
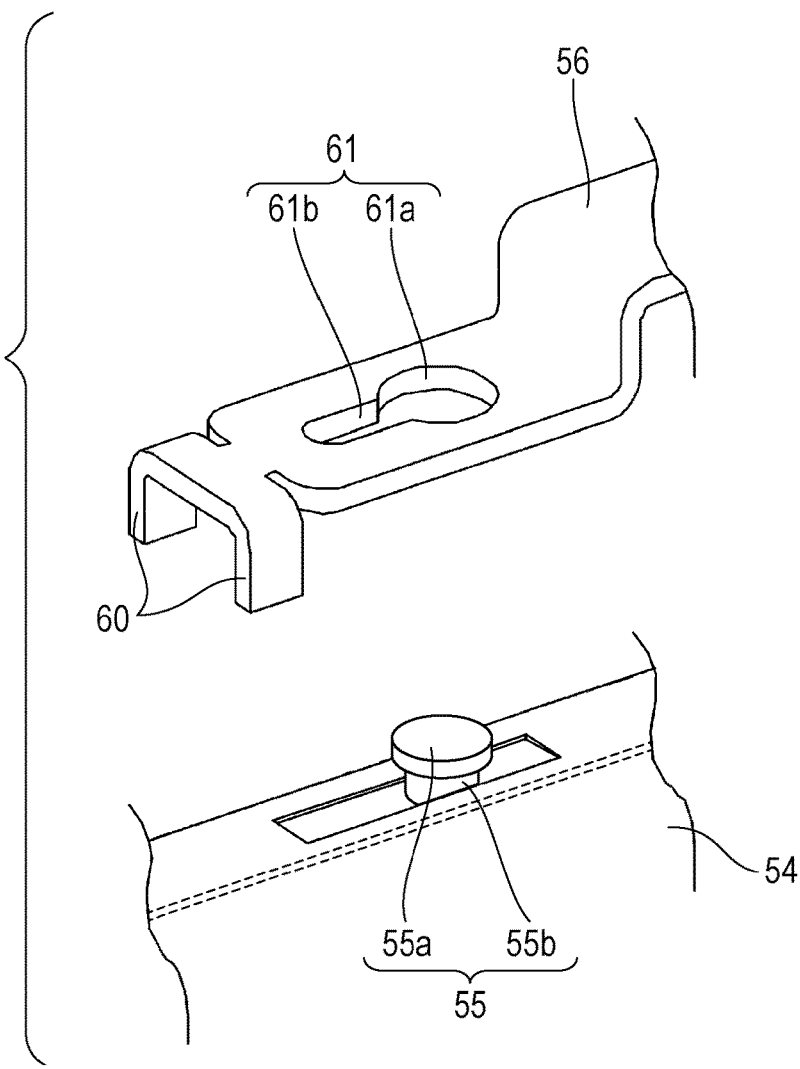
FIG. 40 is a perspective view illustrating the connection between the support member and an ultrasonic flow rate measuring unit of the gas flowmeter according to the eighth exemplary embodiment of the present invention.
Figure 41:
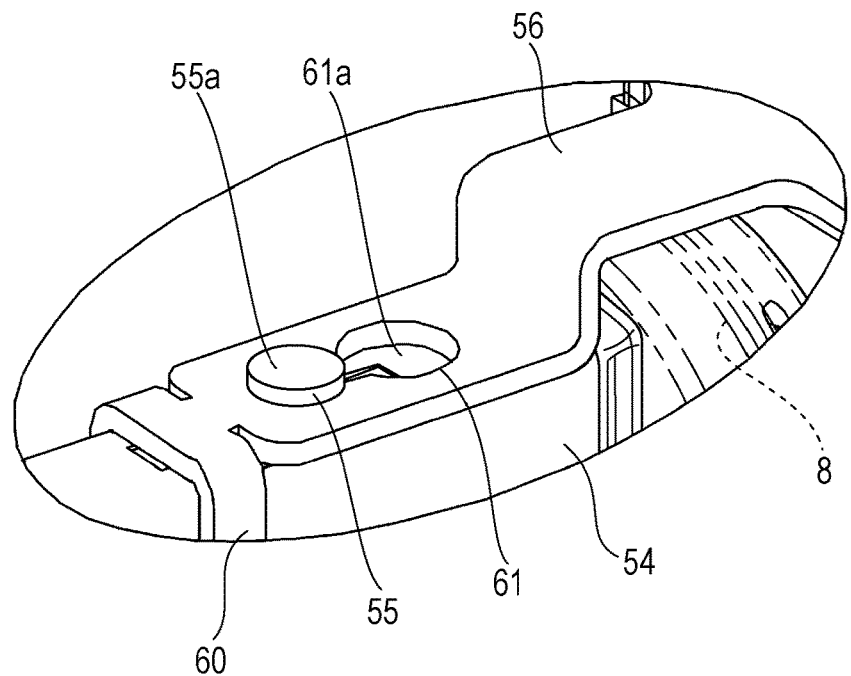
FIG. 41 is a perspective view showing a connection state between the support member and the ultrasonic flow rate measuring unit of the gas flowmeter according to the eighth exemplary embodiment of the present invention.
Figure 42:
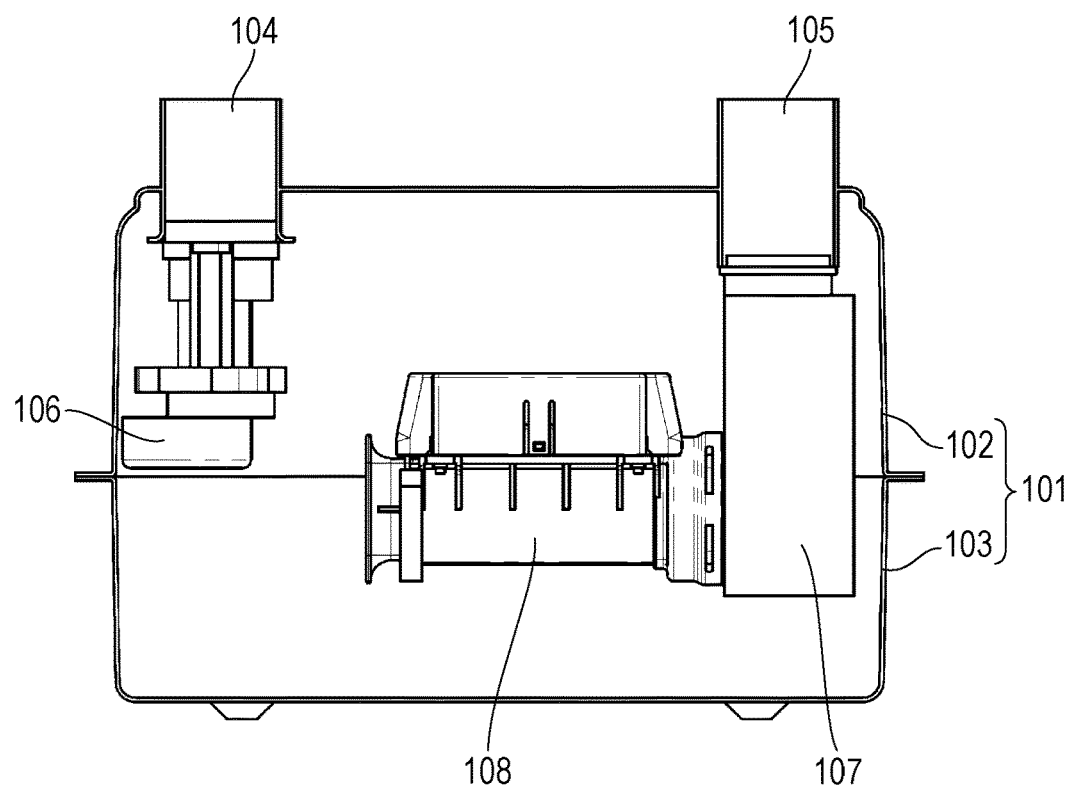
FIG. 42 is a side view of a conventional gas flowmeter.

FIG. 34 is a cross-sectional view of a gas flowmeter according to the eighth exemplary embodiment of the present invention. FIG. 35 is a cross-sectional view of a main part of the gas flowmeter. FIG. 36 is a cross-sectional view taken along line 36-36 in FIG. 35. FIG. 37 is a cross-sectional view taken along line 37-37 in FIG. 35. FIG. 38 is a perspective view of a main part of the gas flowmeter. FIG. 39 is a perspective view of a support member of the gas flowmeter. FIG. 40 is a perspective view illustrating the connection between support member 56 and ultrasonic flow rate measuring unit 54 of the gas flowmeter. FIG. 41 is a perspective view showing a connection state between support member 56 and ultrasonic flow rate measuring unit 54 of the gas flowmeter.

In the eighth exemplary embodiment, fixing portion 55 is formed on a lower surface of ultrasonic flow rate measuring unit 54 in a projecting manner. Fixing portion 55 is formed by head portion 55a having an approximately circular shape and leg portion 55b having a smaller diameter than head portion 55a.

Support member 56 includes base portion 57 fixed to a lower surface of connecting pipe 7, and holding portion 58 extending from base portion 57. Holding portion 58 holds ultrasonic flow rate measuring unit 54. Base portion 57 has projections 59 for positioning at four corners of an upper surface of base portion 57. Support member 56 is adhered and fixed in a state where projections 59 of base portion 57 are inserted into positioning holes (not shown in the drawing) formed in a lower surface of connecting pipe 7 thus positioning projections 59. Holding portion 58 has raised lugs 60 for positioning both side surfaces of ultrasonic flow rate measuring unit 54 on a free end side thereof. Holding portion 58 has mounting hole 61 of an elongated hole shape having a large-diameter circular hole, that is, a key hole shape on one end side thereof. Mounting hole 61 is formed of: circular hole portion 61a which allows insertion of head portion 55a of fixing portion 55; and elongated hole portion 61b which is continuously formed with circular hole portion 61a, has a narrower width than circular hole portion 61a, and has a wider width than leg portion 55b of fixing portion 55.

In the above configuration, in ultrasonic flow rate measuring unit 54, both side surfaces are positioned by raised lugs 60 of holding portion 58 of support member 56, and head portion 55a of fixing portion 55 is inserted into circular hole portion 61a of mounting hole 61. Then, ultrasonic flow rate measuring unit 54 is made to slide and is fixed to support member 56 in such a manner that leg portion 55b of fixing portion 55 is positioned in elongated hole portion 61b of mounting hole 61.

Then, outflow port 54a of ultrasonic flow rate measuring unit 54 is connected to mounting portion 8 of connecting pipe 7 and base portion 57 of support member 56 is fixed to a lower surface of connecting pipe 7.

In ultrasonic flow rate measuring unit 54, inflow port 54b is supported by support member 56 and, at the same time, outflow port 54a is connected to mounting portion 8 of connecting pipe 7 and hence, ultrasonic flow rate measuring unit 54 is supported in a stable manner. With such a configuration, swinging of ultrasonic flow rate measuring unit 54 is suppressed and hence, stable flow rate measurement can be performed.

As described above, in this exemplary embodiment, ultrasonic flow rate measuring unit 54 has fixing portion 55 projecting from a lower surface of the ultrasonic flow rate measuring unit. Support member 56 has base portion 57 and holding portion 58. Fixing portion 55 has head portion 55a having a substantially circular shape, and leg portion 55b having a smaller diameter than head portion 55a. Base portion 57 has projection 59, and connecting pipe 7 is adhered and fixed to base portion 57. Holding portion 58 has raised lugs 60, and positions ultrasonic flow rate measuring unit 54. Holding portion 58 has circular hole portion 61a into which head portion 55a is inserted, and elongated hole portion 61b having a wider width than the leg portion. Further, leg portion 55b is positioned in elongated hole portion 61b. With such a configuration, swinging of ultrasonic flow rate measuring unit 54 is suppressed and hence, stable flow rate measurement can be performed.

INDUSTRIAL APPLICABILITY

As described above, according to the gas flow meter of the present invention, by connecting and fixing the ultrasonic flow rate measuring unit with the flow passage, the movement of the ultrasonic flow rate measuring unit including vibrations thereof can be suppressed. Accordingly, the gas flowmeter is useful as a gas flowmeter having high flow rate measuring accuracy.

REFERENCE MARKS IN THE DRAWINGS 1 device body
2 upper case
3 lower case
4 inlet pipe
5 outlet pipe
6 cut-off valve
7 connecting pipe
8 mounting portion
9 ultrasonic flow rate measuring unit
9a inflow port
9b outflow port
10 support member
11 holding portion
12 fixing portion
13 restricting portion
14 projecting portion
15 recessed groove
16 support arm
17 ultrasonic flow rate measuring unit
17a outflow port
17b inflow port
18 locking projection
19 support member
20 fixing portion
21 locking pawl
22 support arm
23 ultrasonic flow rate measuring unit
23b inflow port
24 locking recessed portion
25 support member
26 fixing portion
27 locking pawl
28 support arm
29 ultrasonic flow rate measuring unit
29b inflow port
30 locking recessed portion
31 support member
32 fixing portion
33 through hole
34 bolt
35 support member
36 lower support member
37 upper support member
38 fixing portion
39 restricting portion
40 support arm
41 locking pawl
42 recessed portion
43 locking hole portion
44 ultrasonic flow rate measuring unit
44a outflow port
44b inflow port
45 locking projecting portion
46 support member
47 recessed portion
48 locking pawl
49 support arm
50 support member
51 fixing portion
52 engaging pawl
53 support leg
54 ultrasonic flow rate measuring unit
54a outflow port
54b inflow port
55 fixing portion
55a head portion
55b leg portion
56 support member
57 base portion
58 holding portion
59 projection
60 raised lug
61 mounting hole
61a circular hole portion
61b elongated hole portion

The invention claimed is:
1. A gas flowmeter comprising:
a device body which accommodates a fluid to be measured, the device body comprising an upper case and a lower case;

an inlet pipe through which the fluid to be measured flows into the device body;
an outlet pipe through which the fluid to be measured flows out from the device body through a connecting pipe;
an ultrasonic flow rate measuring unit comprising an inflow port and an outflow port, the ultrasonic flow rate measuring unit performing flow rate measurement of the fluid to be measured which flows from the inflow port toward the outflow port in the ultrasonic flow rate measuring unit;
wherein the connecting pipe is disposed between the ultrasonic flow rate measuring unit and the outlet pipe, and is connected to the outlet pipe;
a single support member supports the ultrasonic flow rate measuring unit at a single location proximal to the inflow port of the ultrasonic flow rate measuring unit, the single support member comprising a first support arm and a second support arm, wherein the first support arm of the single support member is disposed and held by a first holding portion formed on a first contact portion between the upper case and the lower case, and the second support arm of the single support member is disposed and held by a second holding portion formed on a second contact portion between the upper case and the lower case; and
wherein the ultrasonic flow rate measuring unit is further secured to the connecting pipe.

2. The gas flowmeter according to claim 1, wherein the support member is supported by the device body.

3. The gas flowmeter according to claim 1, wherein the support member includes a fixing portion for fixing the ultrasonic flow rate measuring unit.

4. The gas flowmeter according to claim 3, wherein the fixing portion comprises a restricting portion which positions the ultrasonic flow rate measuring unit and is formed on the fixing portion.

5. The gas flowmeter according to claim 3, wherein the fixing portion has a recessed groove into which a projecting portion of the ultrasonic flow rate measuring unit is inserted.

6. The gas flowmeter according to claim 3, wherein the fixing portion has locking pawls on a left side and a right side of an upper surface of the fixing portion,
the ultrasonic flow rate measuring unit has locking projections on lower portions of both side surfaces of the ultrasonic flow rate measuring unit, and
the locking pawls engage with the locking projections.

7. The gas flowmeter according to claim 3, wherein the fixing portion has locking pawls on a left side and a right side of an upper surface of the fixing portion,
the ultrasonic flow rate measuring unit has locking recessed portions on lower portions of both side surfaces of the ultrasonic flow rate measuring unit, and
the ultrasonic flow rate measuring unit is locked by making locking pawls and locking recessed portions engage with each other.

8. The gas flowmeter according to claim 1, wherein the ultrasonic flow rate measuring unit has a locking recessed portion on a side surface of the ultrasonic flow rate measuring unit,
the support member has a through hole, and
a bolt threadedly engages with the through hole, and a distal end of the bolt is inserted into the locking recessed portion.

9. The gas flowmeter according to claim 1, wherein the support member includes a lower support member and an upper support member, the lower support member has support arms extending outward on both sides, and locking pawls extending upward from upper surfaces of the support arms, and
the upper support member has locking hole portions into which the locking pawls are inserted and locked.

10. The gas flowmeter according to claim 1, wherein the ultrasonic flow rate measuring unit has locking projecting portions on both side surfaces of the ultrasonic flow rate measuring unit, and the support member has engaging pawls which engage with the locking projecting portions.

11. A gas flowmeter comprising:
a device body which accommodates a fluid to be measured;
an inlet pipe through which the fluid to be measured flows into the device body;
an outlet pipe through which the fluid to be measured flows out from the device body through a connecting pipe;
an ultrasonic flow rate measuring unit comprising an inflow port and an outflow port, the ultrasonic flow rate measuring unit performing flow rate measurement of the fluid to be measured which flows from the inflow port toward the outflow port in the ultrasonic flow rate measuring unit;
wherein the connecting pipe is disposed between the ultrasonic flow rate measuring unit and the outlet pipe, and is connected to the outlet pipe;
a single support member supports the ultrasonic flow rate measuring unit at a single location proximal to the inflow port of the ultrasonic flow rate measuring unit;
wherein the ultrasonic flow rate measuring unit is further secured to the connecting pipe; and
wherein the ultrasonic flow rate measuring unit has locking projecting portions on both side surfaces of the ultrasonic flow rate measuring unit, and
the support member has engaging pawls which engage with the locking projecting portions and a support leg which extends downward from the support member and is brought into contact with an inner bottom surface of the device body.

12. A gas flowmeter comprising:
a device body which accommodates a fluid to be measured;
an inlet pipe through which the fluid to be measured flows into the device body;
an outlet pipe through which the fluid to be measured flows out from the device body through a connecting pipe;
an ultrasonic flow rate measuring unit comprising an inflow port and an outflow port, the ultrasonic flow rate measuring unit performing flow rate measurement of the fluid to be measured which flows from the inflow port toward the outflow port in the ultrasonic flow rate measuring unit;
wherein the connecting pipe is disposed between the ultrasonic flow rate measuring unit and the outlet pipe, and is connected to the outlet pipe;
a single support member supports the ultrasonic flow rate measuring unit at a single location proximal to the inflow port of the ultrasonic flow rate measuring unit;
wherein the ultrasonic flow rate measuring unit is further secured to the connecting pipe; and
wherein the ultrasonic flow rate measuring unit has another fixing portion projecting from a lower surface of the ultrasonic flow rate measuring unit,
the support member has a base portion and a holding portion, the another fixing portion has a head portion having a substantially circular shape, and a leg portion having a smaller diameter than the head portion, the base portion has a projection, and the connecting pipe is adhered and fixed to the base portion, the holding portion has raised lugs and positions the ultrasonic flow rate measuring unit, the holding portion has a circular hole portion into which the head portion is inserted, and an elongated hole portion having a wider width than the leg portion, and the leg portion is positioned in the elongated hole portion.

\* \* \* \* \*